United States Patent
Kasahara et al.

(10) Patent No.: US 7,805,553 B2
(45) Date of Patent: Sep. 28, 2010

(54) INTEGRATED CIRCUIT DEVICE AND ELECTRONIC INSTRUMENT

(75) Inventors: Shoichiro Kasahara, Minowa (JP); Fumikazu Komatsu, Okaya (JP); Mitsuaki Sawada, Suwa (JP); Yoshiyuki Kamihara, Sapporo (JP); Takuya Ishida, Sapporo (JP)

(73) Assignee: Seiko Epson Corporation (JP)

( * ) Notice: Subject to any disclaimer, the term of this patent is extended or adjusted under 35 U.S.C. 154(b) by 815 days.

(21) Appl. No.: 11/604,011

(22) Filed: Nov. 22, 2006

(65) Prior Publication Data

US 2007/0156932 A1 Jul. 5, 2007

(30) Foreign Application Priority Data

Nov. 25, 2005 (JP) ............................. 2005-340765
Jul. 7, 2006 (JP) ............................. 2006-187814

(51) Int. Cl.
*G06F 13/12* (2006.01)
*G06F 13/38* (2006.01)

(52) U.S. Cl. .......................................... 710/62; 710/71
(58) Field of Classification Search .................. 710/62, 710/71

See application file for complete search history.

(56) References Cited

U.S. PATENT DOCUMENTS

| 6,707,314 | B2 | 3/2004 | Kasahara et al. |
| 7,051,124 | B2 | 5/2006 | Ishida et al. |
| 2002/0047738 | A1* | 4/2002 | Kamihara .................. 327/237 |
| 2002/0049872 | A1* | 4/2002 | Kamihara et al. ............ 710/71 |
| 2005/0134309 | A1* | 6/2005 | Komatsu et al. ............. 326/47 |
| 2005/0259756 | A1* | 11/2005 | Kasahara ................... 375/257 |

FOREIGN PATENT DOCUMENTS

| JP | 2002-343864 | 11/2002 |
| JP | 2002-344537 | 11/2002 |

\* cited by examiner

*Primary Examiner*—Henry W Tsai
*Assistant Examiner*—Hyun Nam
(74) *Attorney, Agent, or Firm*—Harness, Dickey & Pierce, P.L.C.

(57) ABSTRACT

An integrated circuit device includes a common transceiver macrocell including a circuit necessary for host operation and a circuit necessary for device operation. The common transceiver macrocell includes an analog front-end circuit and a high-speed logic circuit. The high-speed logic circuit includes a parallel/serial conversion circuit, a first parallel interface which serves as an interface between an external circuit and the parallel/serial conversion circuit, a sampling clock generation circuit, a serial/parallel conversion circuit, and a second parallel interface which serves as an interface between the serial/parallel conversion circuit and the external circuit.

23 Claims, 22 Drawing Sheets

INTEGRATED CIRCUIT DEVICE AND ELECTRONIC INSTRUMENT

Japanese Patent Application No. 2005-340765 filed on Nov. 25, 2005 and Japanese Patent Application No. 2006-187814 filed on Jul. 7, 2006, are hereby incorporated by reference in their entirety.

BACKGROUND OF THE INVENTION

The present invention relates to an integrated circuit device and an electronic instrument.

The USB 2.0 standard has been known which achieves a data transfer rate of 480 Mbps (HS mode), which is remarkably higher than that of the USB 1.1 standard, while maintaining compatibility with the USB 1.1 standard (JP-A-2002-344537). The USB 2.0 Transceiver Macrocell Interface (UTMI) standard has also been provided which defines the interface specifications of the USB 2.0 physical layer circuit and the like.

A transceiver macrocell conforming to the UTMI standard can be used for a USB device, but cannot be used for a USB host. Accordingly, when using a transceiver macrocell for a USB host, a transceiver macrocell corresponding to the USB host must be provided.

In recent years, incorporation of a USB host function in a peripheral electronic instrument such as a printer or a digital camera has been increasingly demanded. Therefore, a transceiver macrocell corresponding to a USB device and a transceiver macrocell corresponding to a USB host must be incorporated in a USB integrated circuit device (data transfer control device) provided in such an electronic instrument.

On the other hand, the circuit scale of the integrated circuit device is increased when incorporating a USB device transceiver macrocell and a USB host transceiver macrocell in the integrated circuit device.

SUMMARY

According to one aspect of the invention, there is provided an integrated circuit device comprising:

at least one common transceiver macrocell for transferring data through a serial bus and having a circuit necessary for host operation and a circuit necessary for device operation;

the common transceiver macrocell including:

an analog front-end circuit including a circuit for transmitting and receiving data through the serial bus; and a high-speed logic circuit;

the high-speed logic circuit including:

a parallel/serial conversion circuit which converts parallel data from an external circuit of the common transceiver macrocell into serial data;

a first parallel interface which serves as an interface between the external circuit and the parallel/serial conversion circuit;

a sampling clock generation circuit which generates a sampling clock signal for sampling serial data received through the serial bus;

a serial/parallel conversion circuit which converts serial data received through the serial bus into parallel data; and a second parallel interface which serves as an interface between the serial/parallel conversion circuit and the external circuit.

According to another aspect of the invention, there is provided an integrated circuit device comprising:

at least one common transceiver macrocell for transferring data through a serial bus and having a circuit necessary for host operation and a circuit necessary for device operation;

the common transceiver macrocell including:

an analog front-end circuit including a circuit for transmitting and receiving data through the serial bus; and a high-speed logic circuit;

the analog front-end circuit including:

a first transfer mode transmitter circuit which transmits data through the serial bus in a first transfer mode;

a second transfer mode transmitter circuit which transmits data through the serial bus in a second transfer mode which is higher in speed than the first transfer mode;

a third transfer mode transmitter circuit which transmits data through the serial bus in a third transfer mode which is higher in speed than the second transfer mode;

a first single-ended receiver circuit connected with a first signal line of differential data signal lines making up the serial bus;

a second single-ended receiver circuit connected with a second signal line of the differential data signal lines;

a second transfer mode receiver circuit which receives data through the serial bus in the second transfer mode;

a third transfer mode receiver circuit which receives data through the serial bus in the third transfer mode;

a first detection circuit which detects whether data of the differential data signal lines is valid or invalid;

a second detection circuit which detects disconnection of the serial bus;

a pull-up circuit for pulling up the first signal line of the differential data signal lines;

a first pull-down circuit for pulling down the first signal line of the differential data signal lines; and a second pull-down circuit for pulling down the second signal line of the differential data signal lines.

According to a further aspect of the invention, there is provided an electronic instrument comprising:

one of the above integrated circuit devices; and a processing section which controls the integrated circuit device.

BRIEF DESCRIPTION OF THE SEVERAL VIEWS OF THE DRAWING

FIG. 11 shows a layout example of LS and FS transmitter circuits and the like.

FIG. 12 shows a detailed layout example of LS and FS transmitter circuits and the like.

FIGS. 14A, 14B, and 14C show signal waveform examples of a transmission control signal and the like.

DETAILED DESCRIPTION OF THE EMBODIMENT

Figure 1:
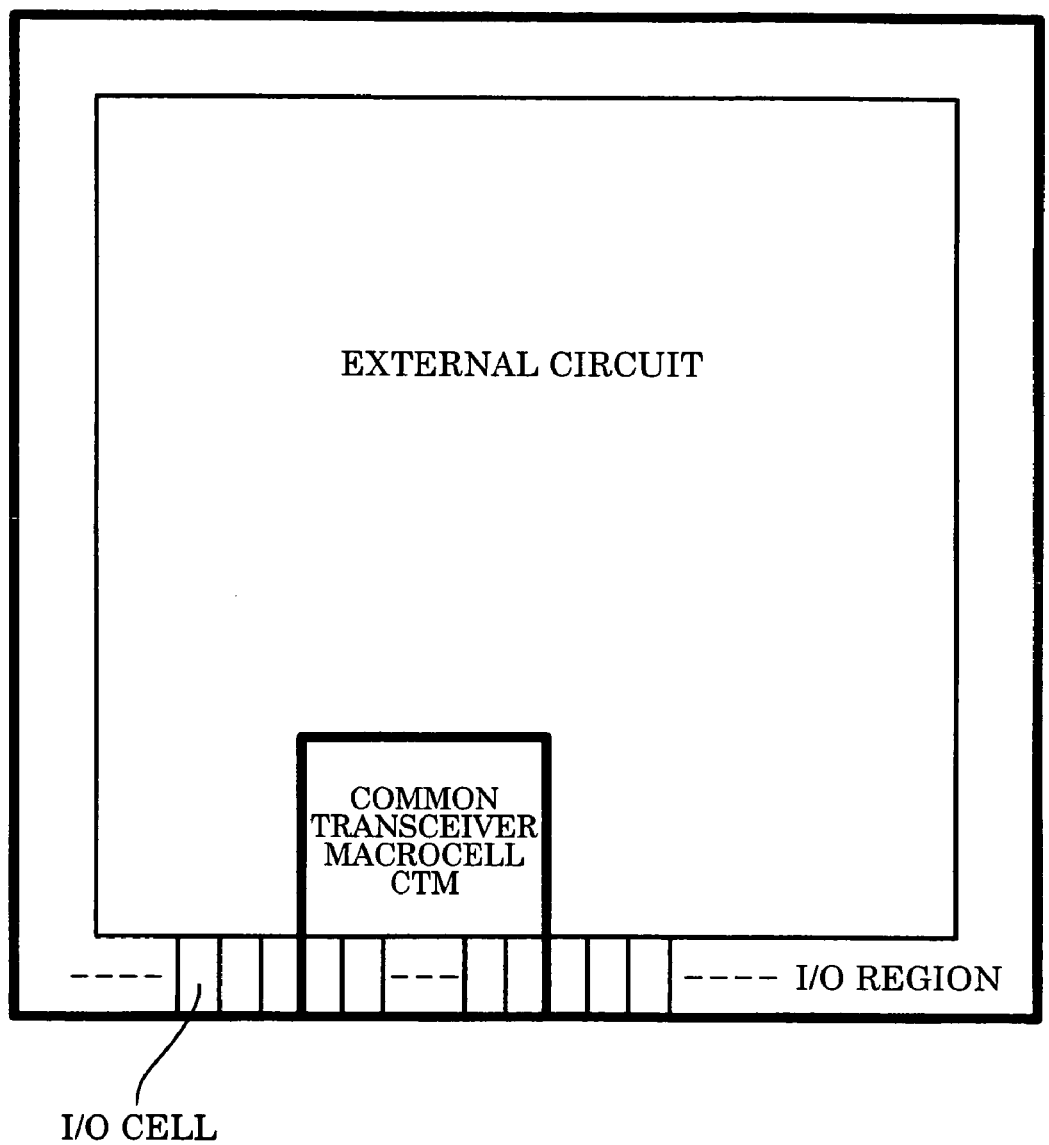
FIG. 1 shows a layout example of an integrated circuit device.

The invention may provide an integrated circuit device which can implement host operation and device operation using a small-scale transceiver macrocell, and an electronic instrument including the integrated circuit device.

According to one embodiment of the invention, there is provided an integrated circuit device comprising:

at least one common transceiver macrocell for transferring data through a serial bus and having a circuit necessary for host operation and a circuit necessary for device operation;

the common transceiver macrocell including:

an analog front-end circuit including a circuit for transmitting and receiving data through the serial bus; and a high-speed logic circuit;

the high-speed logic circuit including:

a parallel/serial conversion circuit which converts parallel data from an external circuit of the common transceiver macrocell into serial data;

a first parallel interface which serves as an interface between the external circuit and the parallel/serial conversion circuit;

a sampling clock generation circuit which generates a sampling clock signal for sampling serial data received through the serial bus;

a serial/parallel conversion circuit which converts serial data received through the serial bus into parallel data; and a second parallel interface which serves as an interface between the serial/parallel conversion circuit and the external circuit.

According to this embodiment, the common transceiver macrocell including a circuit necessary for the host operation and a circuit necessary for the device operation is provided. According to this embodiment, the common transceiver macrocell is separated from the external circuit at the first and second parallel interfaces. This allows circuit parts which can be commonly used for the host function and the device function to be configured as the common transceiver macrocell. Therefore, an integrated circuit device can be provided which can implement the host operation and the device operation using a small-scale transceiver macrocell.

In the integrated circuit device according to this embodiment, the analog front-end circuit may include:

a first transfer mode transmitter circuit which transmits data through the serial bus in a first transfer mode;

a second transfer mode transmitter circuit which transmits data through the serial bus in a second transfer mode which is higher in speed than the first transfer mode;

a third transfer mode transmitter circuit which transmits data through the serial bus in a third transfer mode which is higher in speed than the second transfer mode;

a first single-ended receiver circuit connected with a first signal line of differential data signal lines making up the serial bus;

a second single-ended receiver circuit connected with a second signal line of the differential data signal lines;

a second transfer mode receiver circuit which receives data through the serial bus in the second transfer mode;

a third transfer mode receiver circuit which receives data through the serial bus in the third transfer mode;

a first detection circuit which detects whether data of the differential data signal lines is valid or invalid;

a second detection circuit which detects disconnection of the serial bus;

a pull-up circuit for pulling up the first signal line of the differential data signal lines;

a first pull-down circuit for pulling down the first signal line of the differential data signal lines; and a second pull-down circuit for pulling down the second signal line of the differential data signal lines.

According to another embodiment of the invention, there is provided an integrated circuit device comprising:

at least one common transceiver macrocell for transferring data through a serial bus and having a circuit necessary for host operation and a circuit necessary for device operation;

the common transceiver macrocell including:

an analog front-end circuit including a circuit for transmitting and receiving data through the serial bus; and a high-speed logic circuit;

the analog front-end circuit including:

a first transfer mode transmitter circuit which transmits data through the serial bus in a first transfer mode;

a second transfer mode transmitter circuit which transmits data through the serial bus in a second transfer mode which is higher in speed than the first transfer mode;

a third transfer mode transmitter circuit which transmits data through the serial bus in a third transfer mode which is higher in speed than the second transfer mode;

a first single-ended receiver circuit connected with a first signal line of differential data signal lines making up the serial bus;

a second single-ended receiver circuit connected with a second signal line of the differential data signal lines;

a second transfer mode receiver circuit which receives data through the serial bus in the second transfer mode;

a third transfer mode receiver circuit which receives data through the serial bus in the third transfer mode;

a first detection circuit which detects whether data of the differential data signal lines is valid or invalid;

a second detection circuit which detects disconnection of the serial bus;

a pull-up circuit for pulling up the first signal line of the differential data signal lines;

a first pull-down circuit for pulling down the first signal line of the differential data signal lines; and a second pull-down circuit for pulling down the second signal line of the differential data signal lines.

According to this embodiment, the common transceiver macrocell including a circuit necessary for the host operation and a circuit necessary for the device operation is provided. According to this embodiment, the analog front-end circuit of the common transceiver macrocell includes the first, second, and third transfer mode transmitter circuits, the first and second single-ended receiver circuits, the second and third transfer mode receiver circuits, the first and second detection circuits, the pull-up circuit, and the first and second pull-down circuits. Providing such circuits in the common transceiver macrocell allows the common transceiver macrocell to be used as a host macrocell and a device macrocell. Moreover, the common transceiver macrocell can be configured using the minimum circuits without providing unnecessary circuits. Therefore, the host operation and the device operation can be implemented using a small-scale transceiver macrocell.

In the integrated circuit device according to this embodiment, the analog front-end circuit may include:

a third detection circuit which monitors voltage of a power supply line making up the serial bus, and activates a detection signal when the voltage of the power supply line has exceeded a specific voltage.

This prevents a problem in which electric power is unnecessarily consumed by the receiver circuit and the like before connection to the serial bus.

In the integrated circuit device according to this embodiment, the first transfer mode first transmitter circuit may include a first transmission driver which drives the first signal line of the differential data signal lines and a second transmission driver which drives the second signal line of the differential data signal lines;

the second transfer mode second transmitter circuit may include a third transmission driver which drives the first signal line of the differential data signal lines and a fourth transmission driver which drives the second signal line of the differential data signal lines;

a first P-type transistor forming the first transfer mode first transmission driver and a third P-type transistor forming the second transfer mode third transmission driver may be formed in a first P-type transistor area;

a first N-type transistor forming the first transfer mode first transmission driver and a third N-type transistor forming the second transfer mode third transmission driver may be formed in a first N-type transistor area;

a second P-type transistor forming the first transfer mode second transmission driver and a fourth P-type transistor forming the second transfer mode fourth transmission driver may be formed in a second P-type transistor area; and a second N-type transistor forming the first transfer mode second transmission driver and a fourth N-type transistor forming the second transfer mode fourth transmission driver may be formed in a second N-type transistor area.

According to this embodiment, the P-type transistor forming the first transfer mode transmission driver and the P-type transistor forming the second transfer mode transmission driver are formed in a same transistor area. The N-type transistor forming the first transfer mode transmission driver and the N-type transistor forming the second transfer mode transmission driver are formed in a same transistor area. Therefore, the first transfer mode transmitter circuit and the second transfer mode transmitter circuit can be realized with a reduced transistor area, whereby the data transmission in the first and second transfer modes can be realized using small-scale circuits.

In the integrated circuit device according to this embodiment, the first P-type transistor area and the first N-type transistor area may be adjacently formed; and the second P-type transistor area and the second N-type transistor area may be adjacently formed.

This further reduces the circuit area required for the first transfer mode transmitter circuit and the second transfer mode transmitter circuit.

The integrated circuit device according to this embodiment may comprise:

a first damping resistor provided between a first node connected with output nodes of the first and third transmission drivers and the first signal line; and a second damping resistor provided between a second node connected with output nodes of the second and fourth transmission drivers and the second signal line;

wherein the first damping resistor may be formed in a first resistor area adjacent to the first N-type transistor area; and wherein the second damping resistor may be formed in a second resistor area adjacent to the second N-type transistor area.

This allows the first and second damping resistors to be provided in the integrated circuit device, and minimizes an increase in the circuit scale due to provision of the first and second damping resistors.

The integrated circuit device according to this embodiment may comprise:

a first terminating resistor circuit provided between a first node connected with output nodes of the first and third transmission drivers and a second power supply; and a second terminating resistor circuit provided between a second node connected with output nodes of the second and fourth transmission drivers and the second power supply;

wherein an N-type transistor forming the first terminating resistor circuit may be formed in the first N-type transistor area; and wherein an N-type transistor forming the second terminating resistor circuit may be formed in the second N-type transistor area.

This minimizes an increase in the circuit due to provision of the first and second terminating resistor circuits.

The integrated circuit device according to this embodiment may comprise:

a terminating resistor control circuit which variably controls terminating resistances of the first and second terminating resistor circuits.

This enables the amplitude of the output signal (output high level voltage) to be adjusted by controlling the terminating resistance.

The integrated circuit device according to this embodiment may comprise:

a setting information register in which information for setting whether to use the common transceiver macrocell as a host transceiver macrocell or a device transceiver macrocell is stored.

This allows the common transceiver macrocell to be used for the host or the device according to the setting by means of firmware or hardware, thereby making it possible to deal with various applications.

In the integrated circuit device according to this embodiment, the common transceiver macrocell may be disposed on a side of the integrated circuit device.

This ensures that the arrangement of the common transceiver macrocell is not limited to the corner, whereby the degrees of freedom of the arrangement can be increased.

The integrated circuit device according to this embodiment may comprise:

a plurality of the common transceiver macrocells;

wherein the common transceiver macrocells may be disposed on one side of the integrated circuit device.

This allows the integrated circuit device to implement the both function of the host and the device, or allows the integrated circuit device to be provided with two or more ports.

The integrated circuit device according to this embodiment may comprise:

a plurality of the common transceiver macrocells;

wherein at least one of the common transceiver macrocells may be respectively disposed on at least two of first to fourth sides of the integrated circuit device.

This allows the integrated circuit device to implement the both function of the host and the device, or allows the integrated circuit device to be provided with four or more ports, for example.

In the integrated circuit device according to this embodiment, the serial bus may be a Universal Serial Bus (USB) bus.

According to a further embodiment of the invention, there is provided an electronic instrument comprising:

one of the integrated circuit devices; and a processing section which controls the integrated circuit device.

Preferred embodiments of the invention are described below in detail. Note that the embodiments described below do not in any way limit the scope of the invention defined by the claims laid out herein. Note that all elements of the embodiments described below should not necessarily be taken as essential requirements for the invention.

1. Layout of Integrated Circuit Device

FIG. 1 shows a layout example of an integrated circuit device according to this embodiment. The integrated circuit device includes a common transceiver macrocell CTM and an external circuit (another circuit) which is a circuit other than the common transceiver macrocell CTM. The external circuit may be realized using one or more macrocells, for example. The macrocell (megacell or macroblock) is a medium-scale or large-scale circuit unit having a logic function.

The common transceiver macrocell CTM is a macrocell for transferring data through a serial bus such as a USB bus, and includes a circuit necessary for host operation and a circuit necessary for device operation. For example, the macrocell CTM may include a circuit which can be used for the host operation and the device operation, a circuit used for the host operation, a circuit used for the device operation, and the like, and is mainly formed of a physical layer circuit.

The macrocell CTM is a hard macro of which the routing and the circuit cell placement are fixed, for example. In more detail, the routing and the circuit cell placement of the macrocell CTM are achieved by a manual layout. Note that the routing and the placement may be partially automated.

The external circuit includes a soft macro of which the routing and the circuit cell placement are automated, for example. The external circuit may include a circuit in a layer (link layer, transaction layer, or application layer) higher than the physical layer and the like. In the soft macro, the routing between basic cells and the like are automatically performed using a gate array automatic placement and routing tool, for example. Note that the routing and placement may be partially fixed.

2. Circuit Configuration of Integrated Circuit Device

Figure 2:
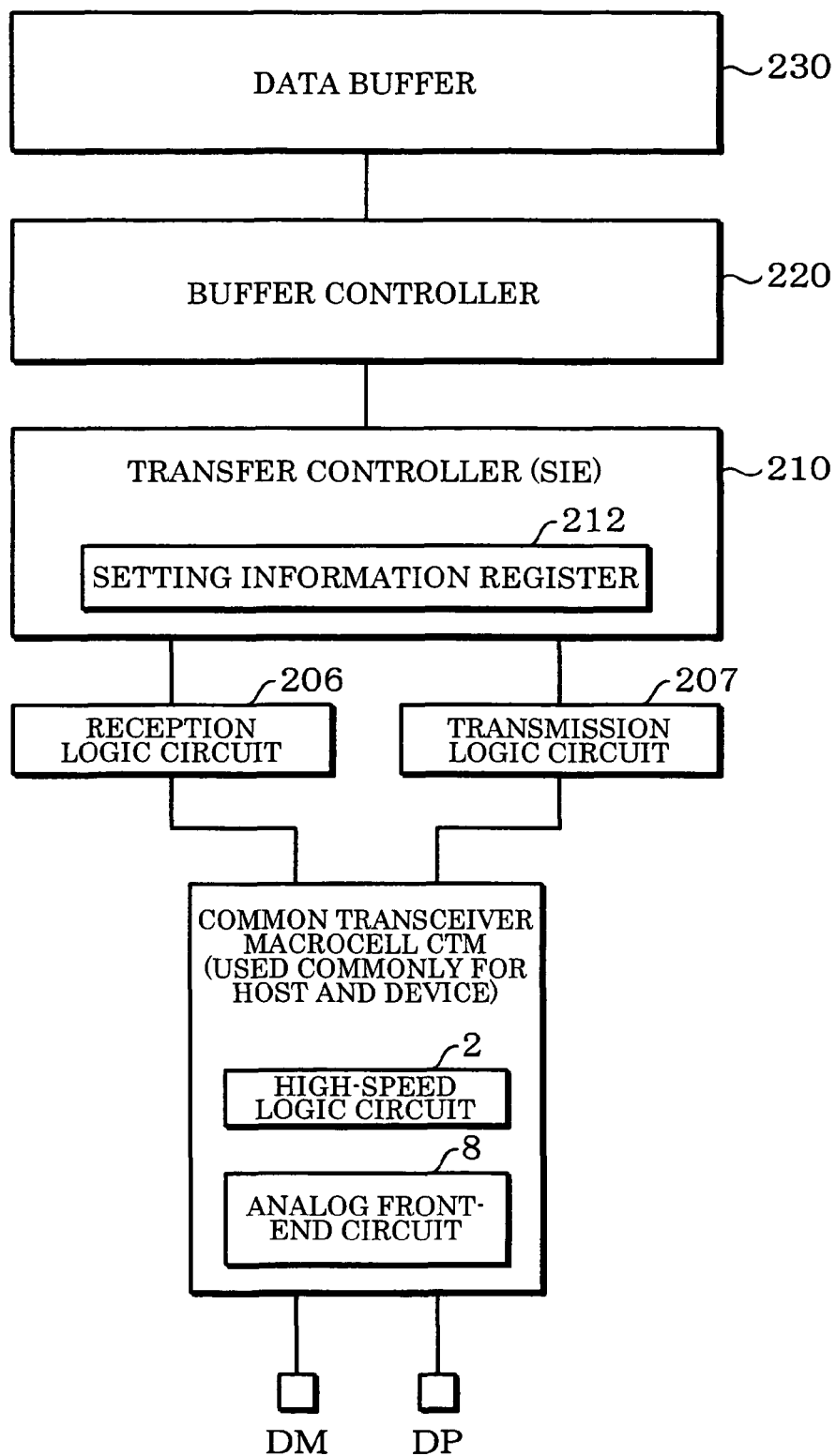
FIG. 2 shows a configuration example of a data transfer control device realized using an integrated circuit device according to one embodiment of the invention.

FIG. 2 shows a circuit configuration example of a data transfer control device realized using the integrated circuit device according to this embodiment. Note that the device realized using the integrated circuit device according to this embodiment is not limited to the configuration shown in FIG. 2. For example, a data transfer control device having a configuration differing from the configuration shown in FIG. 2 may be realized. A configuration such as an application layer device or a CPU (processor in a broad sense) may be added to the configuration shown in FIG. 2 to form a one-chip integrated circuit device.

The data transfer control device shown in FIG. 2 includes a common transceiver macrocell CTM, a reception logic circuit 206, a transmission logic circuit 207, a transfer controller 210, a buffer controller 220, and a data buffer 230. Note that some of these circuit blocks may be omitted, or the connection configuration of the circuit blocks may be changed, or another circuit block may be added. For example, a configuration may also be employed in which the buffer controller 220 and the data buffer 230 are omitted. Or, an interface circuit may be additionally provided which realizes an interface through a DMA bus to which the application layer device is connected or a CPU bus to which a CPU (processing section) is connected.

The common transceiver macrocell CTM includes a high-speed logic circuit 2 (logical layer circuit) and an analog front-end circuit 8 including a circuit for transferring data through a serial bus. In more detail, the high-speed logic circuit 2 includes a circuit which performs parallel/serial conversion, a circuit which performs serial/parallel conversion, a circuit which generates a sampling clock signal, and the like. The analog front-end circuit 8 includes a circuit which transmits data and a circuit which receives data using signal lines (first and second signal lines in a broad sense) for signals DP and DM making up differential data signals (differential pair).

The reception logic circuit 206 is a circuit for receiving data through a serial bus. In more detail, the reception logic circuit 206 receives parallel data converted from serial data using the serial/parallel conversion circuit of the high-speed logic circuit 2 of the macrocell CTM, and performs specific logic processing. For example, the reception logic circuit 206 may detect and delete a SYNC, SOP, and EOP of received data or perform bit unstuffing or the like.

The transmission logic circuit 207 is a circuit for transmitting data through a serial bus. In more detail, the transmission logic circuit 207 outputs parallel data subjected to specific logic processing to the parallel/serial conversion circuit of the high-speed logic circuit 2 of the macrocell CTM. For example, the transmission logic circuit 207 may add a SYNC, SOP, and EOP to transmission data or perform bit stuffing or the like.

The transfer controller 210 is a controller for controlling data transfer through a USB bus and realizing a function of a serial interface engine (SIE) or the like. For example, the transfer controller 210 performs packet handling, suspend & resume control, transaction management, and the like. The transfer controller 210 may include a link controller and a transaction controller (not shown). The transfer controller 210 may also include a host controller which controls data transfer during the host operation, a device controller which controls data transfer during the device operation, and the like.

The setting information register 212 is a register in which information for setting whether to use the common transceiver macrocell CTM as a host transceiver macrocell or a device transceiver macrocell is stored.

For example, when the host operation has been set in the setting information register 212, the transfer controller 210 operates as a host controller. In this case, the transfer controller 210 transfers data using the macrocell CTM as a host transceiver macrocell. This allows the data transfer control device or an electronic instrument provided with the data transfer control device to operate as a USB host. On the other hand, when the device operation has been set in the setting information register 212, the transfer controller 210 operates as a device controller. In this case, the transfer controller 210 transfers data using the macrocell CTM as a device transceiver macrocell. This allows the data transfer control device or an electronic instrument provided with the data transfer control device to operate as a USB device.

The information may be set in the setting information register 212 by means of software using an upper-level layer (firmware and CPU), or by means of hardware using a switch or the like.

The buffer controller 220 allocates a memory region (e.g. endpoint region and pipe region) in the data buffer 230, or controls access to the memory region of the data buffer 230. In more detail, the buffer controller 220 controls access from the application layer device, access from the CPU, or access from the USB (transfer controller 210), arbitrates these accesses, or generates and manages access addresses.

The data buffer 230 (packet buffer) is a buffer (FIFO) for temporarily storing (buffering) data (transmission data or reception data) transferred through the USB bus. The data buffer 230 may be formed of a memory such as a RAM.

3. Common Transceiver Macrocell

Figure 3:
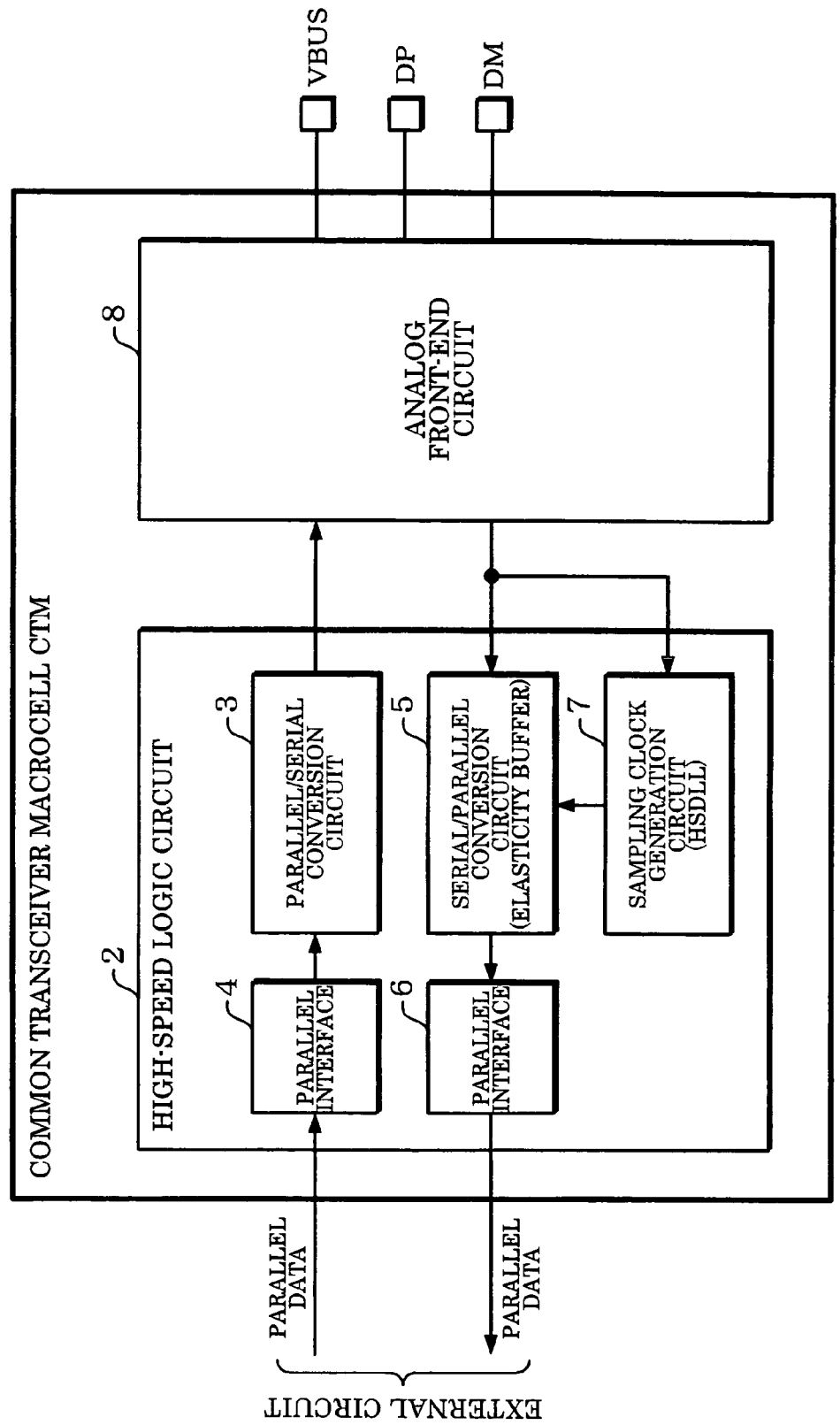
FIG. 3 shows a configuration example of a high-speed logic circuit of a common transceiver macrocell.

A detailed configuration example of the common transceiver macrocell CTM is described below. FIG. 3 shows a configuration example of the high-speed logic circuit 2 included in the macrocell CTM. As shown in FIG. 3, the high-speed logic circuit 2 includes a parallel/serial conversion circuit 3, a first parallel interface 4, a serial/parallel conversion circuit 5, and a second parallel interface 6. The high-speed logic circuit 2 also includes a sampling clock generation circuit 7. Note that some of these circuit blocks may be omitted, or the connection configuration of the circuit blocks may be changed, or another circuit block may be added.

The parallel/serial conversion circuit 3 receives parallel data from the external circuit (transmission logic circuit and transfer controller) of the macrocell CTM through the parallel interface 4, and converts the parallel data into serial data. The parallel/serial conversion circuit 3 outputs the resulting serial data to the analog front-end circuit 8.

The parallel interface 4 is a circuit which serves as an interface between the external circuit (transmission logic circuit and transfer controller) and the parallel/serial conversion circuit 3. The parallel interface 4 includes a signal buffer circuit and the like. In more detail, the parallel interface 4 receives eight-bit parallel data, a data valid signal indicating whether or not the parallel data is valid, and various control signals, and outputs the data and the signals to the parallel/serial conversion circuit 3.

The serial/parallel conversion circuit 5 receives serial data received by the analog front-end circuit 8 through the serial bus, and converts the serial data into parallel data. The serial/parallel conversion circuit 5 outputs the resulting parallel data to the external circuit (reception logic circuit and transfer controller) of the macrocell CTM. The serial/parallel conversion circuit 5 may include an elasticity buffer which receives and holds serial data input in synchronization with a high-frequency clock signal (e.g. clock signal with a frequency of 480 MHz), and outputs data cell data in synchronization with a low-frequency clock signal (e.g. clock signal with a frequency of 60 MHz). The serial/parallel conversion circuit 5 can be provided with not only the serial/parallel conversion function, but also a buffer function of absorbing (compensating for) the difference in clock frequency, the difference in phase, and the like by providing such an elasticity buffer.

The parallel interface 6 is a circuit which serves as an interface between the serial/parallel conversion circuit 5 and the external circuit (reception logic circuit and transfer controller). The parallel interface 6 includes a signal buffer circuit and the like. In more detail, the parallel interface 6 outputs 32-bit parallel data or a data valid signal indicating whether or not the eight-bit data cell making up the parallel data is valid to the external circuit, and receives various control signals such as a data strobe signal from the external circuit.

The sampling clock generation circuit 7 (HSDLL) generates a sampling clock signal for sampling serial data received through the serial bus. The serial/parallel conversion circuit 5 samples serial data based on the sampling clock signal, and converts the serial data into parallel data. The sampling clock generation circuit 7 may include an edge detection circuit which detects edges of first to Nth clock signals with the same frequency but different phases between which the data edge exists, for example. The sampling clock generation circuit 7 may also include a clock signal select circuit which selects one of the first to Nth clock signals based on the edge detection information from the edge detection circuit, and outputs the selected clock signal as the sampling clock signal. In this case, the first to Nth clock signals may be generated by a clock generation circuit 108 (PLL) included in the analog front-end circuit 8.

Figure 4:
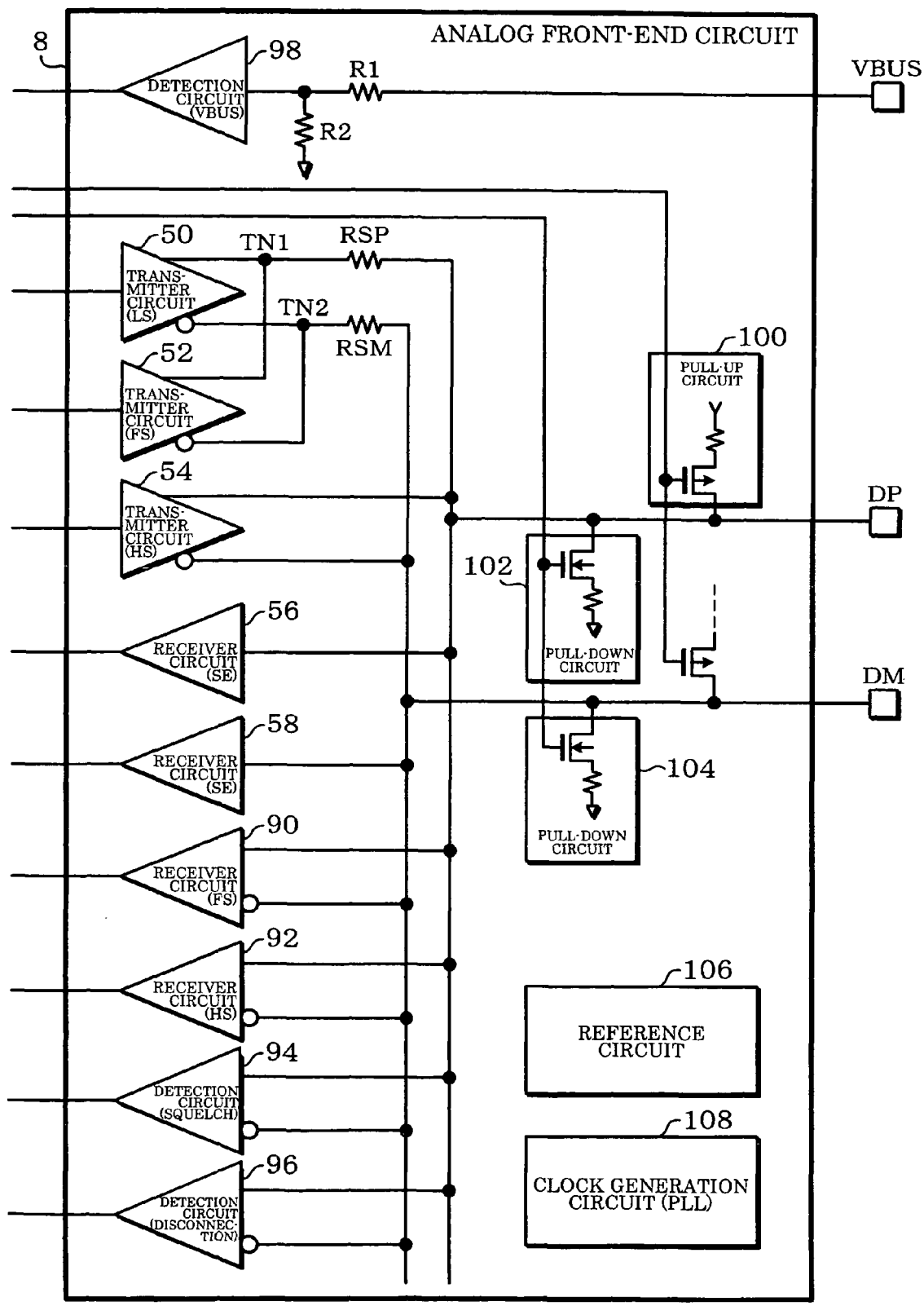
FIG. 4 shows a configuration example of an analog front-end circuit of a common transceiver macrocell.

FIG. 4 shows a configuration example of the analog front-end circuit 8. The analog front-end circuit 8 includes a low speed (LS) transmitter circuit 50, a full speed (FS) transmitter circuit 52, and a high speed (HS) transmitter circuit 54. The analog front-end circuit 8 also includes single-ended receiver circuits 56 and 58, an FS receiver circuit 90, and an HS receiver circuit 92. The analog front-end circuit 8 also includes detection circuits 94, 96, and 98, a pull-up circuit 100, and pull-down circuits 102 and 104. The analog front-end circuit 8 further includes a reference circuit 106 and the clock generation circuit 108 (PLL). Note that some of these circuit blocks may be omitted, or the connection configuration of the circuit blocks may be changed, or another circuit block may be added.

The transmitter circuit 50 is a circuit which transmits data through the USB bus (serial bus in a broad sense) in the USB LS mode (first transfer mode in a broad sense). Specifically, the transmitter circuit 50 performs low-speed (LS) data transmission by driving the DP and DM signal lines of the USB bus.

The transmitter circuit 52 is a circuit which transmits data through the USB bus in the USB FS mode (second transfer mode in a broad sense). Specifically, the transmitter circuit 52 performs full-speed (FS) data transmission by driving the DP and DM signal lines of the USB bus. Damping resistors RSP and RSM (fixed resistors) are respectively provided between first and second nodes TN1 and TN2 connected with the outputs of the transmitter circuits 50 and 52 and the DP and DM signal lines.

The transmitter circuit 54 (differential current driver) is a circuit which transmits data through the USB bus in the USB HS mode (third transfer mode in a broad sense). Specifically, the transmitter circuit 54 performs high-speed (HS) data transmission by driving the DP and DM signal lines of the USB bus.

The receiver circuit 56 (single-ended receiver) is a single-ended receiver circuit connected with the DP signal line (first signal line in a broad sense) of the USB bus. Specifically, the receiver circuit 56 amplifies a single-ended signal input through the DP signal line, and outputs the amplified signal to the circuit in the subsequent stage. The receiver circuit 58 is a single-ended receiver circuit connected with the DM signal line (second signal line in a broad sense) of the USB bus. Specifically, the receiver circuit 58 amplifies a single-ended signal input through the DM signal line, and outputs the amplified signal to the circuit in the subsequent stage. The line state of the DP and DM signal lines can be monitored by using the receiver circuits 56 and 68.

The receiver circuit 90 (differential receiver) is a circuit which receives data through the USB bus in the FS mode. The receiver circuit 90 amplifies the DP and DM differential signals so that serial data transferred at a transfer rate of 12 MHz (FS mode) can be received.

The receiver circuit 92 (differential receiver) is a circuit which receives data through the USB bus in the HS mode. The receiver circuit 92 amplifies the DP and DM differential signals so that serial data transferred at a transfer rate of 480 MHz (HS mode) can be received. The receiver circuit 92 is also used during chirp reception in addition to normal data reception.

The detection circuit 94 (squelch circuit or transmission envelope detector) is a circuit which detects whether data transmitted through the differential data signal lines of the USB bus is valid or invalid, and performs detection processing of distinguishing serial data transferred at a transfer rate of 480 MHz from noise. In more detail, the detection circuit 94 detects that data is valid when the amplitude of the differential data signals exceeds a squelch threshold value. When the detection circuit 94 has detected that the data is valid, the output of the reception data from the HS receiver circuit 92 to the high-speed logic circuit 2 is enabled.

The detection circuit 96 (disconnection envelope detector) is a circuit which detects disconnection of the USB bus (USB cable) during the host operation in the HS mode. In more detail, the detection circuit 96 detects disconnection when the amplitude of the differential data signals has become equal to or greater than a specific voltage. In the FS mode, disconnection may be detected using the single-ended receiver circuits 56 and 58. During the device operation, disconnection may be detected by monitoring a VBUS.

The detection circuit 98 is a circuit which detects the VBUS. In more detail, the detection circuit 98 monitors the voltage obtained by dividing the voltage of the VBUS (power supply line making up serial bus in a broad sense) of the USB bus using resistors R1 and R2 to monitor the VBUS voltage. When the VBUS voltage has exceeded a specific voltage, the detection circuit 98 activates a detection signal.

The pull-up circuit 100 is a circuit for pulling up the DP signal line (first signal line). The pull-down circuit 102 is a circuit for pulling down the DP signal line. The pull-down circuit 104 is a circuit for pulling down the DM signal line (second signal line). Each of the pull-up circuit 100 and the pull-down circuits 102 and 104 may be formed using a resistor and a transistor (switch element). The transistor is ON-OFF controlled by a resistor control circuit (not shown). The on-resistance of the transistor may be utilized as the pull-up resistor or the pull-down resistor. A dummy circuit (dummy transistor) is provided to the DM signal line.

The reference circuit 106 is a circuit which generates various reference voltages and reference currents. An analog circuit (operational amplifier) included in the analog front-end circuit 8 operates using the generated reference voltage or reference current.

The clock generation circuit 108 is a circuit which generates a USB clock signal with a frequency of 480 MHz, and includes a PLL and the like. In more detail, the clock generation circuit 108 generates five-phase clock signals with the same frequency (480 MHz) but different phases, for example. The sampling clock generation circuit 7 shown in FIG. 3 generates the sampling clock signal based on the generated five-phase clock signals.

In this embodiment, the circuit necessary for the USB host and the circuit necessary for the USB device are provided in the single common transceiver macrocell CTM, as described above. Therefore, an upper-level layer such as firmware which operates on the CPU can utilize the macrocell CTM as either the host macrocell or the device macrocell. In more detail, the macrocell CTM can be switched to the host macrocell or the device macrocell by means of software, or can be switched to the host macrocell or the device macrocell by means of hardware. Moreover, the macrocell CTM can also be utilized as the host macrocell or the device macrocell by means of a user application.

For example, a related-art transceiver macrocell conforming to the UTMI standard can be utilized as the device macrocell, but cannot be utilized as the host macrocell. On the other hand, a transceiver macrocell incorporated in a data transfer control device used for the USB host can be utilized as the host macrocell, but cannot be utilized as the device macrocell.

Figure 5:
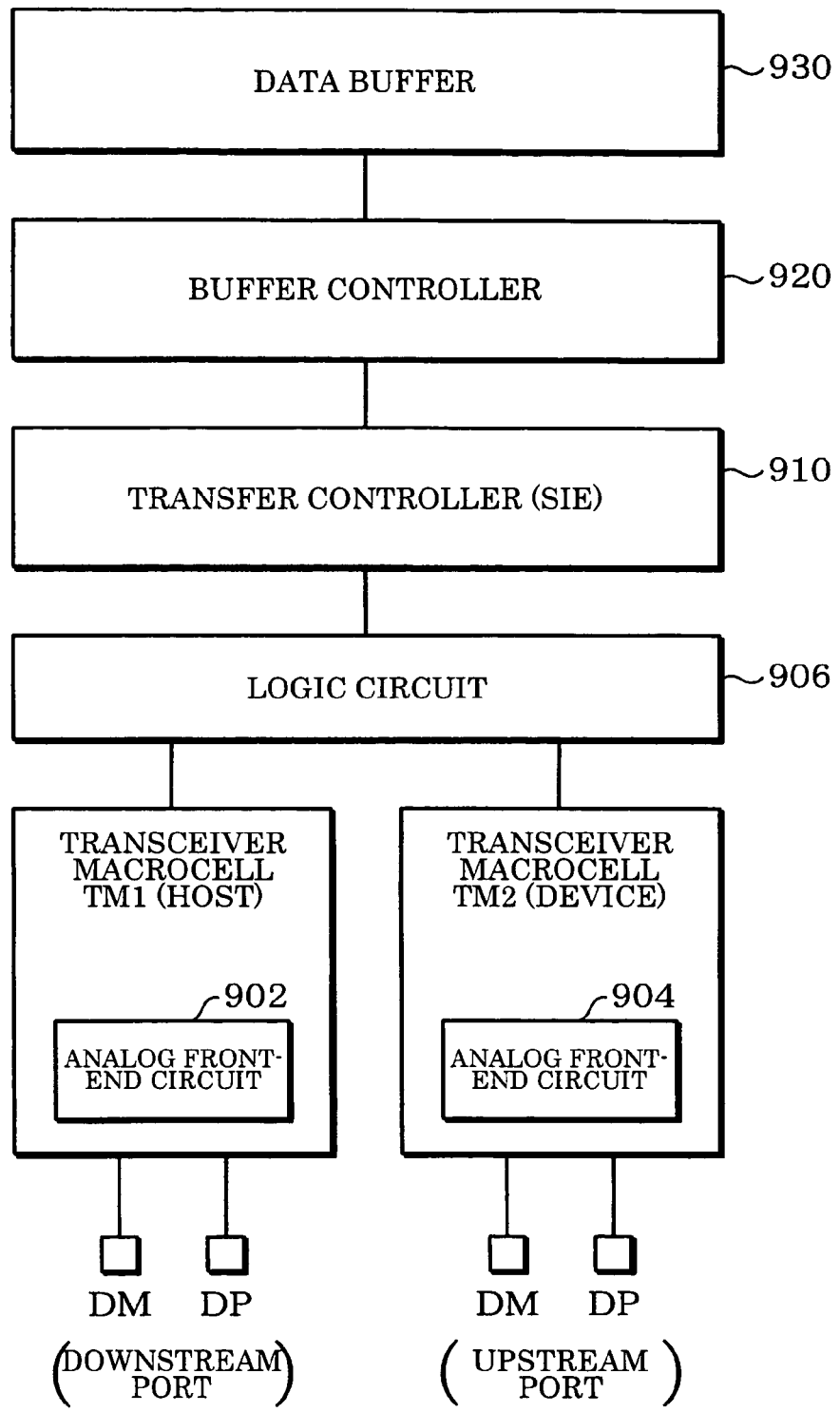
FIG. 5 shows a configuration example of a comparative example.

A data transfer control device with a configuration shown in FIG. 5 may be considered as a comparative example which can implement the host and device functions. A host transceiver macrocell TM1 and a device transceiver macrocell TM2 are provided in FIG. 5. In FIG. 2, the macrocell CTM has only one port. In the comparative example shown in FIG. 5, the host macrocell TM1 has a downstream port, and the device macrocell TM2 has an upstream port.

In the comparative example shown in FIG. 5, since a host analog front-end circuit 902 and a device analog front-end circuit 904 are incorporated in the data transfer control device, the entire circuit scale is increased due to the presence of unnecessary portion. Moreover, the circuit used for the host and the device cannot exhibit equal characteristics for the macrocells TM1 and TM2 due to the difference in layout method.

On the other hand, the macrocell CTM according to this embodiment can be utilized as either the host macrocell or the device macrocell, in which the analog front-end circuit with a minimum configuration is configured as one hard macro. Therefore, since the macrocell CTM according to this embodiment can deal with the host and the device without providing the two macrocells TM1 and TM2, differing from the comparative example shown in FIG. 5, the circuit scale of the analog front-end circuit can be significantly reduced. Moreover, since the upper-level layer selects the host or the device, deterioration in the analog characteristics of the macrocell CTM can be prevented. For example, if the HS transmitter circuit 54 shown in FIG. 4 is designed to exhibit optimum circuit characteristics, equal circuit characteristics can be maintained regardless of whether the macrocell CTM is used as the host macrocell or the device macrocell.

Furthermore, if all the circuit parts of the macrocell CTM have been tested during the test (inspection) before shipment of the integrated circuit device, the performance and the quality of the integrated circuit device can be ensured regardless of whether the macrocell CTM is used for the host or the device, whereby the test process can be simplified.

In FIG. 3, the macrocell CTM is separated from the external circuit at the parallel interfaces 4 and 6. This allows circuit parts which can be utilized for the host function and the device function to be integrated into a hard macro and configured as the macrocell CTM. In FIG. 3, the circuit such as the parallel/serial conversion circuit 3 in the subsequent stage of the parallel interface 4 and the circuit such as the serial/parallel conversion circuit 5 in the preceding stage of the parallel interface 6 can be used during the host operation and the device operation. On the other hand, the circuit in the preceding stage of the parallel interface 4 and the circuit in the subsequent stage of the parallel interface 6 may be changed in the configuration and operation during the host operation and the device operation. Accordingly, the circuit configuration of the macrocell CTM can be minimized by separating the macrocell CTM from the external circuit as shown in FIG. 3, whereby the circuit scale of the integrated circuit device can be reduced.

Moreover, the HS transmission and HS reception clock signal with a frequency of 480 MHz generated by the clock generation circuit 108 can be utilized only in the macrocell CTM without outputting the clock signal to the external circuit by separating the macrocell CTM from the external circuit as shown in FIG. 3. Specifically, the external circuit in the upper-level layer of the macrocell CTM can use only a clock signal with a frequency of 60 MHz.

Figure 6A:
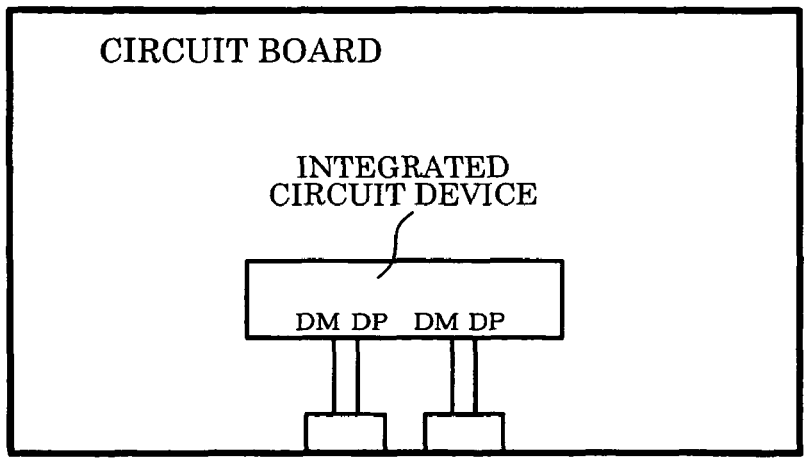
FIGS. 6A, 6B, and 6C are views illustrative of routing and a port of a circuit board.
Figure 6B:
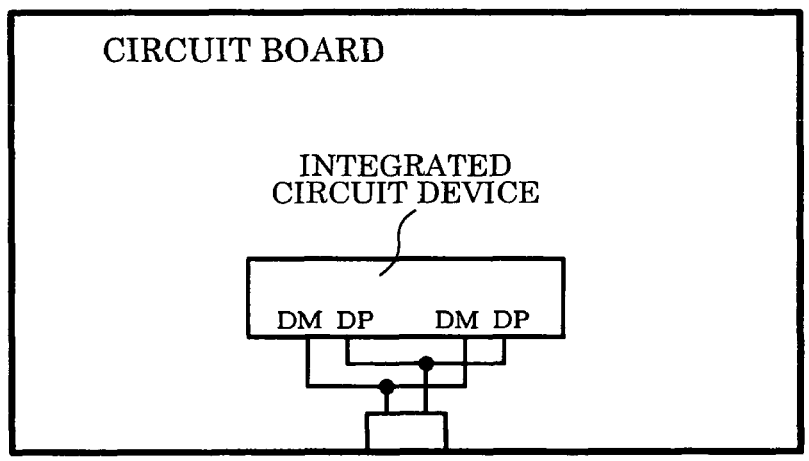

Since the comparative example shown in FIG. 5 has two ports, as shown in FIG. 6A, the routing and the design of the circuit board become complicated. When reducing the number of ports to one, as shown in FIG. 6B, characteristic impedance matching becomes difficult.

Figure 6C:
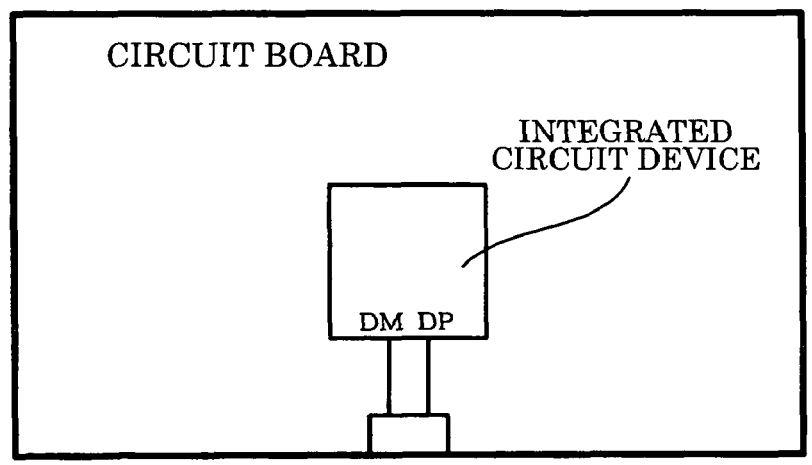

On the other hand, since only one port is necessary for the macrocell CTM according to this embodiment, as shown in FIG. 6C, routing to a USB receptacle and the design of the circuit board can be simplified, whereby characteristic impedance matching can be facilitated.

Figure 7A:
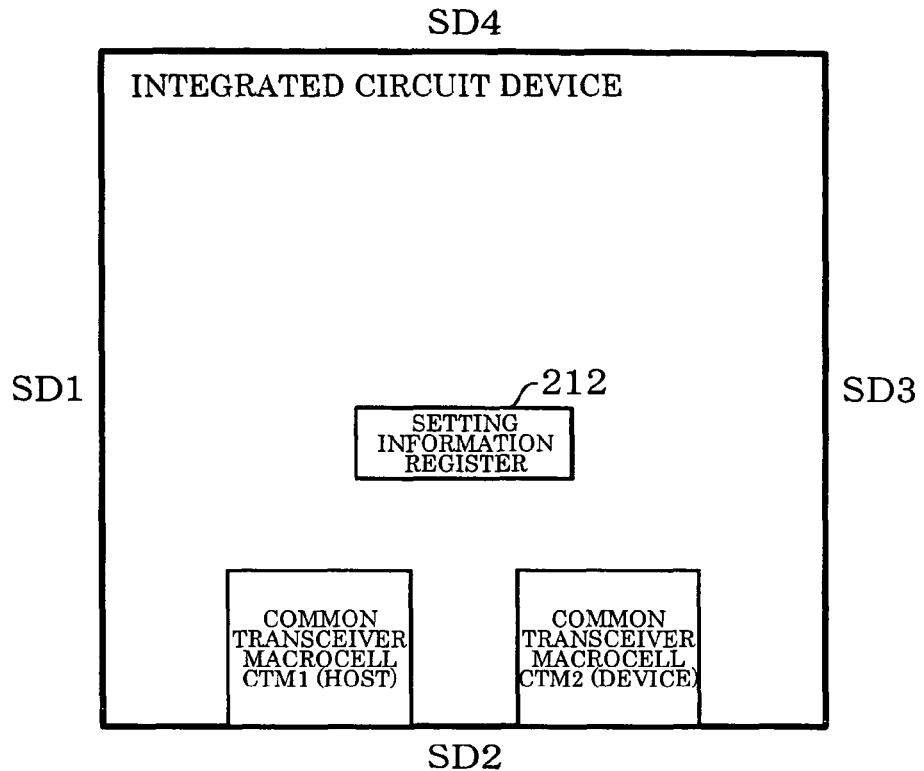
FIGS. 7A and 7B are views illustrative of a method of providing a plurality of transceiver macrocells.

In this embodiment, a plurality of common transceiver macrocells may be disposed in the integrated circuit device, as shown in FIG. 7A. In FIG. 7A, macrocells CTM1 and CTM2 are disposed on a side SD2 of sides SD1, SD2, SD3, and SD4 of the integrated circuit device. The term "side" of the integrated circuit device used herein refers to a region with a given width inside (peripheral portion) of each side of the integrated circuit device. The macrocells CTM1 and CTM2 may be disposed so that the side of the macrocell completely coincides with the side of the integrated circuit device, or may be disposed at a position apart from the side of the integrated circuit device to a small extent.

The configuration shown in FIG. 7A allows the integrated circuit device to be provided with a plurality of ports. For example, when using the macrocell CTM1 as the host macrocell and the macrocell CTM2 as the device macrocell, as shown in FIG. 7A, the integrated circuit device can be provided with a downstream port and an upstream port. Or, both of the macrocells CTM1 and CTM2 may be used for the host or the device.

Note that the upper-level layer (firmware or application) may determine whether to use the macrocells CTM1 and CTM2 for the host or the device by setting information in the setting information register 212. In FIG. 7A, the macrocell CTM1 is set as the host macrocell, and the macrocell CTM2 is set as the device macrocell. The macrocell CTM1 may be set as the device macrocell and the macrocell CTM2 may be set as the host macrocell by rewriting the information stored in the setting information register 212.

Figure 7B:
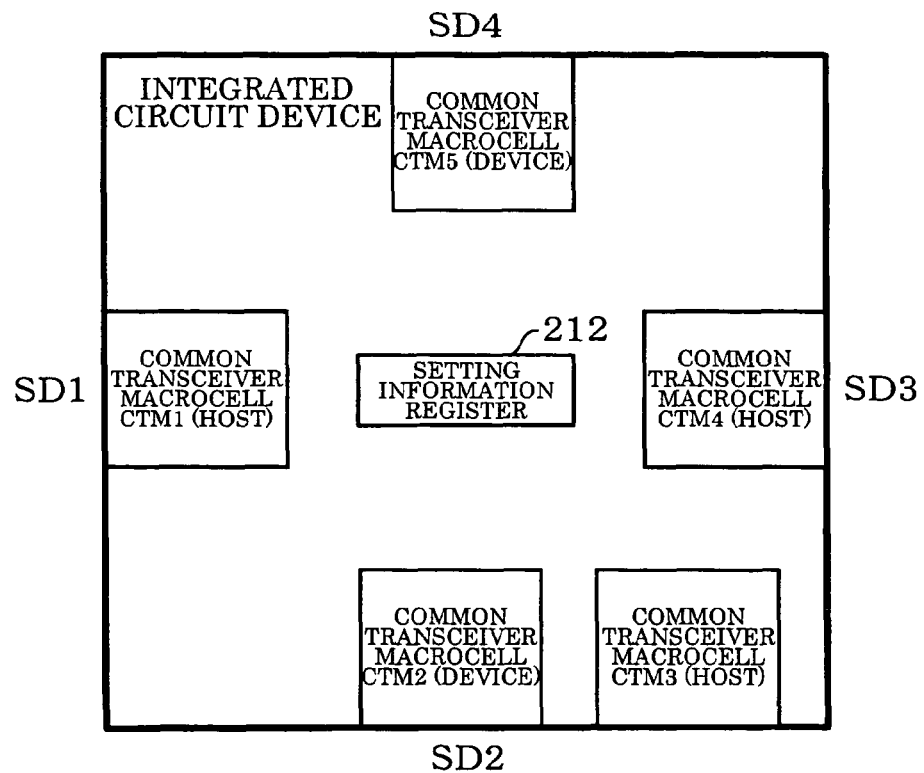

Note that the common transceiver macrocells may be disposed on a plurality of sides of the integrated circuit device instead of one side of the integrated circuit device. Specifically, at least one common transceiver macrocell may be respectively disposed on at least two of the first to fourth sides SD1 to SD4 of the integrated circuit device. In FIG. 7B, the macrocell CTM1 is disposed on the side SD1, the macrocells CTM2 and CTM3 are disposed on the side SD2, the macrocell CTM4 is disposed on the side SD3, and the macrocell CTM5 is disposed on the side SD4.

For example, when the macrocells are disposed only at the corners of the integrated circuit device, the maximum number of ports provided to the integrated circuit device is only four. In FIGS. 7A and 7B, since the macrocell can be disposed on the side of the integrated circuit device, the integrated circuit device can be provided with five or more ports.

As described above, this embodiment allows the common transceiver macrocell to be disposed at an arbitrary position of the side of the integrated circuit device, and allows the common transceiver macrocell to be arbitrarily switched to the host macrocell or the device macrocell. This makes it possible to deal with user's various demands, whereby the degrees of freedom of the user's application can be increased. According to this embodiment, the common transceiver macrocell exhibits equal analog characteristics irrespective of whether the common transceiver macrocell is used as the host macrocell or the device macrocell. Therefore, even if the integrated circuit device is provided with a plurality of ports, common transceiver macrocells exhibiting almost uniform analog characteristics can be disposed, whereby the difference in circuit characteristics between the ports can be minimized.

This embodiment may be applied as follows. For example, when incorporating the integrated circuit device according to this embodiment in a car navigation system, music data or image data can be transferred from the car navigation system (host storage) to a portable music player (device storage) by setting the common transceiver macrocell of the integrated circuit device as the host macrocell. Or, music data stored in the portable music player can be transferred to the car navigation system and reproduced using an amplifier of the car navigation system.

On the other hand, music data or image data can be transferred from the car navigation system (device storage) to a host (host storage) such as a personal computer (PC) by setting the common transceiver macrocell of the integrated circuit device as the device macrocell. Or, map data downloaded to a PC from a WEB site through the Internet can be transferred to the car navigation system.

Figure 8:
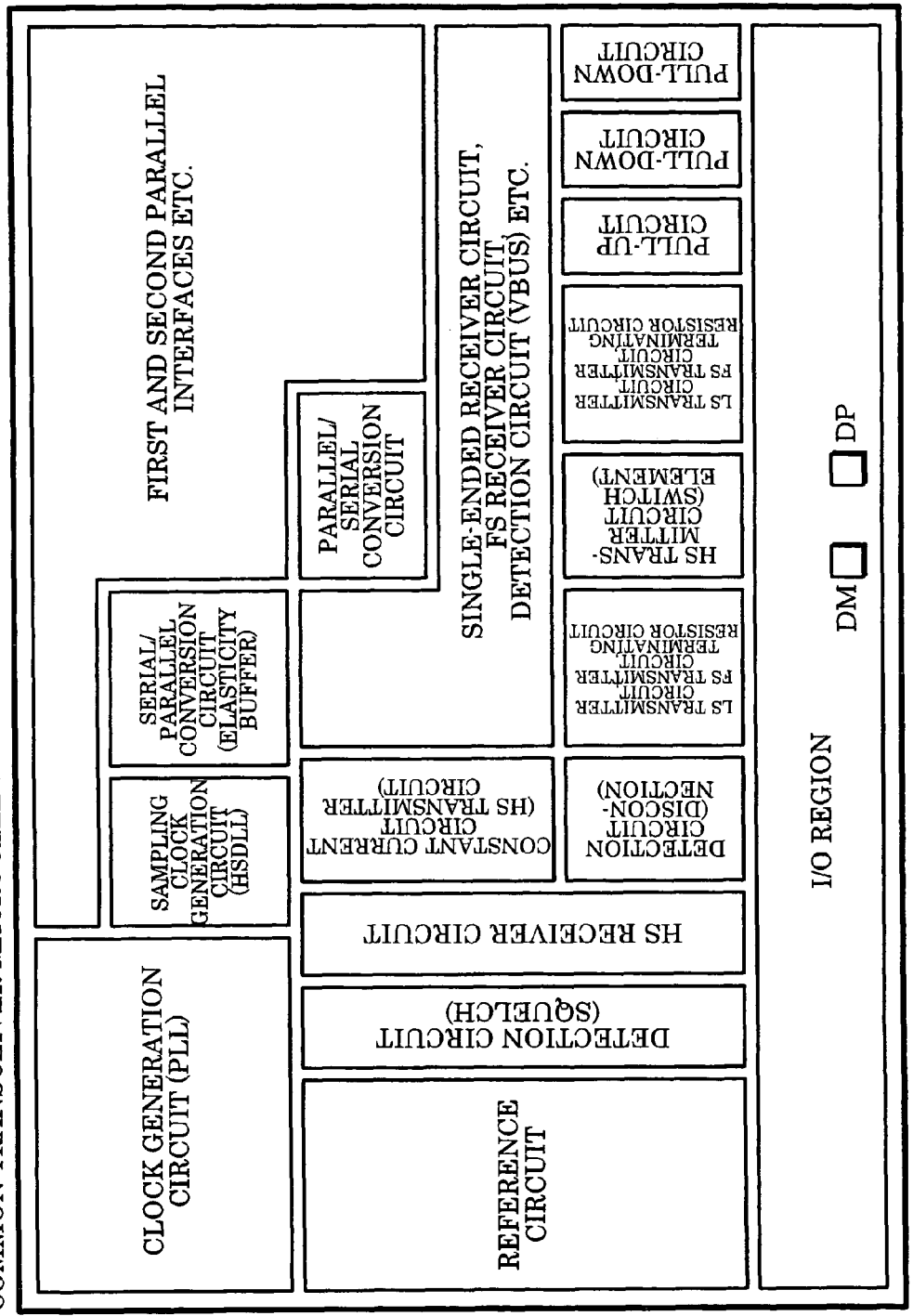
FIG. 8 shows a layout example of a common transceiver macrocell.

FIG. 8 shows a layout example of the common transceiver macrocell CTM. As shown in FIG. 8, the HS transmitter circuit 54 (switch element) is disposed on the direction D2 (direction from the outside toward the inside of the integrated circuit device) side of the DM and DP pads. The LS transmitter circuit 50, the FS transmitter circuit 52, and a terminating resistor circuit described later are disposed on the direction D1 and D3 (direction perpendicular to the direction D2) side of the HS transmitter circuit 54. The pull-up circuit 100 and the pull-down circuits 102 and 104 are disposed on the direction D1 side of these circuits, and the disconnection detection circuit 96, the HS receiver circuit 92, the squelch detection circuit 94, and the reference circuit 106 are disposed on the direction D3 side. The single-ended receiver circuits 56 and 58, the FS receiver circuit 90, the VBUS detection circuit 98, and the like are disposed on the direction D2 side of the HS transmitter circuit 54. The constant current circuit of the HS transmitter circuit 54 is disposed on the direction D3 side of these circuits, and the parallel/serial conversion circuit 3, the first parallel interface 4, the serial/parallel conversion circuit 5, the second parallel interface 6, and the sampling clock generation circuit 7 are disposed on the direction D2 side of the constant current circuit. The clock generation circuit 108 is disposed on the direction D3 side of the sampling clock generation circuit 7.

4. LS and FS Transmitter Circuits

Figure 9:
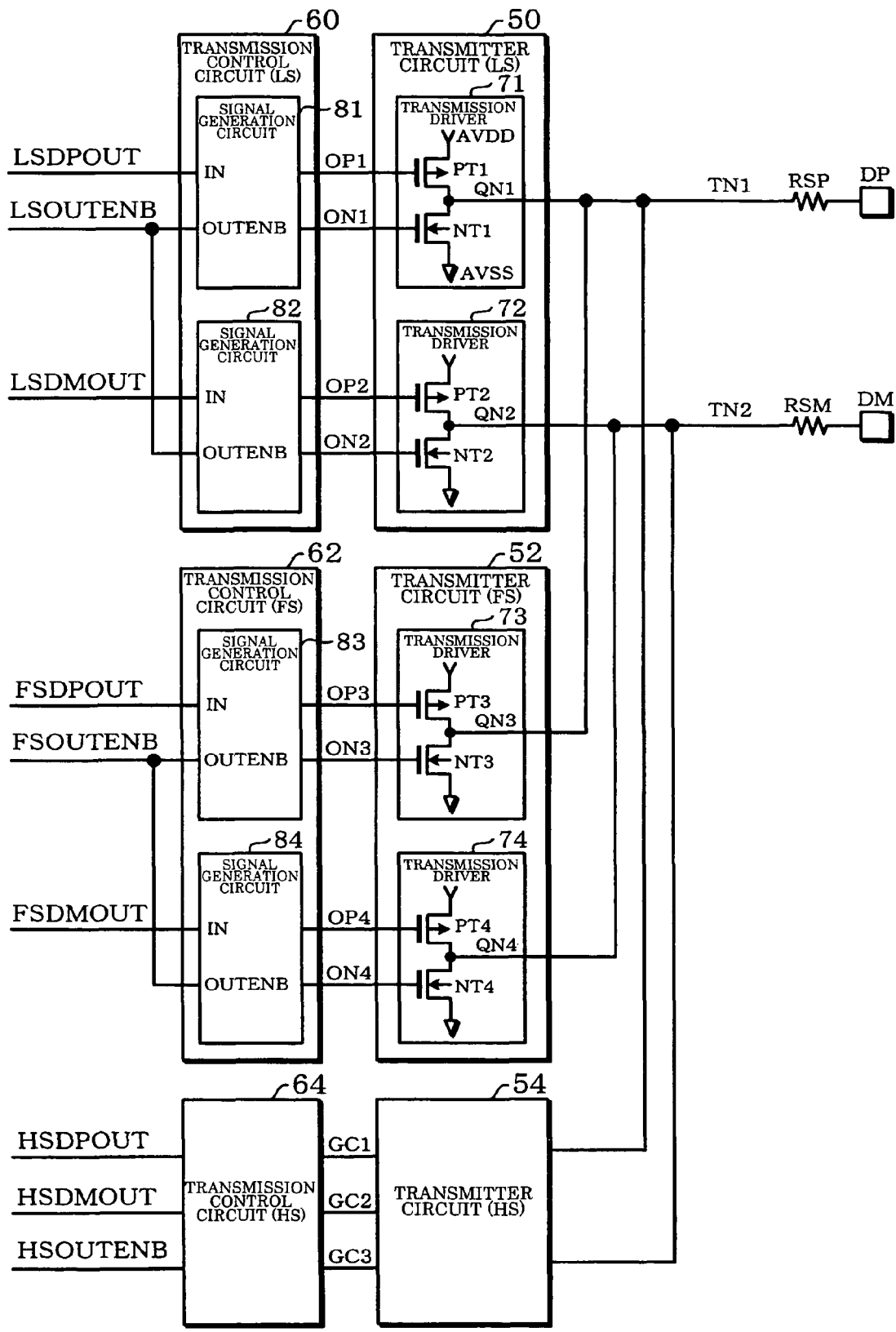
FIG. 9 shows a configuration example of a transmitter circuit and a transmission control circuit.

FIG. 9 shows a configuration example of the LS and FS transmitter circuits 50 and 52 and the transmission control circuits 60 and 62. The LS transmitter circuit 50 includes first transmission drivers 71 and 72 which drive (voltage-drive) the DP and DM signal lines. The FS transmitter circuit 52 includes third and fourth transmission drivers 73 and 74 which drive the DP and DM signal lines. The details of the HS transmitter circuit 54 are described later.

A first P-type transistor PT1 forming the LS DP-side transmission driver 71 is provided between a first output node QN1 (output node of the transmission driver 71) and a power supply AVDD (first power supply in a broad sense). A first P-side transmission control signal OP1 is input to the gate of the first P-type transistor PT1. A first N-type transistor NT1 forming the transmission driver 71 is provided between the output node QN1 and a power supply AVSS (second power supply in a broad sense). A first N-side transmission control signal ON1 is input to the gate of the first N-type transistor NT1.

A second P-type transistor PT2 forming the LS DM-side transmission driver 72 is provided between a second output node QN2 (output node of the transmission driver 72) and the power supply AVDD. A second P-side transmission control signal OP2 is input to the gate of the second P-type transistor PT2. A second N-type transistor NT2 forming the transmission driver 72 is provided between the output node QN2 and the power supply AVSS. A second N-side transmission control signal ON2 is input to the gate of the second N-type transistor NT2.

A third P-type transistor PT3 forming the FS DP-side transmission driver 73 is provided between a third output node QN3 (output node of the transmission driver 73) and the power supply AVDD. A third P-side transmission control signal OP3 is input to the gate of the third P-type transistor PT3. A third N-type transistor NT3 forming the transmission driver 73 is provided between the output node QN3 and the power supply AVSS. A third N-side transmission control signal ON3 is input to the gate of the third N-type transistor NT3.

A fourth P-type transistor PT4 forming the FS DM-side transmission driver 74 is provided between a fourth output node QN4 (output node of the transmission driver 74) and the power supply AVDD. A fourth P-side transmission control signal OP4 is input to the gate of the fourth P-type transistor PT4. A fourth N-type transistor NT4 forming the transmission driver 74 is provided between the output node QN4 and the power supply AVSS. A fourth N-side transmission control signal ON4 is input to the gate of the fourth N-type transistor NT4.

The transmission drivers 71, 72, 73, and 74 are not limited to the configuration shown in FIG. 9. The connection relationship of the transmission drivers 71, 72, 73, and 74 may be changed, or another transistor may be added.

The LS first transmission control circuit 60 receives LS data signals LSDPOUT and LSDMOUT and an enable signal LSOUTENB, and generates and outputs the first P-side and N-side transmission control signals OP1 and ON1 and the second P-side and N-side transmission control signals OP2 and ON2. The transmission control circuit 60 includes a first signal generation circuit 81 which generates the signals OP1 and ON1 and a second signal generation circuit 82 which generates the signals OP2 and ON2.

The FS second transmission control circuit 62 receives FS data signals FSDPOUT and FSDMOUT and an enable signal FSOUTENB, and generates and outputs the third P-side and N-side transmission control signals OP3 and ON3 and the fourth P-side and N-side transmission control signals OP4 and ON4. The transmission control circuit 62 includes a third signal generation circuit 83 which generates the signals OP3 and ON3 and a fourth signal generation circuit 84 which generates the signals OP4 and ON4.

An HS transmission control circuit 64 receives HS data signals HSDPUOT and HSDMOUT and an enable signal HSOUTENB, and generates and outputs first to third transmission control signals GC1, GC2, and GC3.

The LS transmission control circuit 60 outputs the transmission control signals OP1, ON1, OP2, and ON2 of which the rise time or the fall time is longer than the rise time or the fall time of the transmission control signals OP3, ON3, OP4, and ON4 output from the FS transmission control circuit 62. In other words, the LS transmission control circuit 60 outputs a transmission control signal having a low slew rate. The rise time used herein may be defined as the period from the time at which the signal level has reached 10% of the peak value to the time at which the signal level has reached 90% of the peak value. The fall time used herein may be defined as the period from the time at which the signal level has reached 90% of the peak value to the time at which the signal level has reached 10% of the peak value.

As shown in FIG. 9, the integrated circuit device according to this embodiment may include the first damping resistor RSP (fixed resistor) provided between the first node TN1 connected with the output nodes QN1 and QN3 of the transmission drivers 71 and 73 and the DP signal line. The integrated circuit device may also include the second damping resistor RSM (fixed resistor) provided between the second node TN2 connected with the output nodes QN2 and QN4 of the transmission drivers 72 and 74 and the DM signal line.

Figure 10:
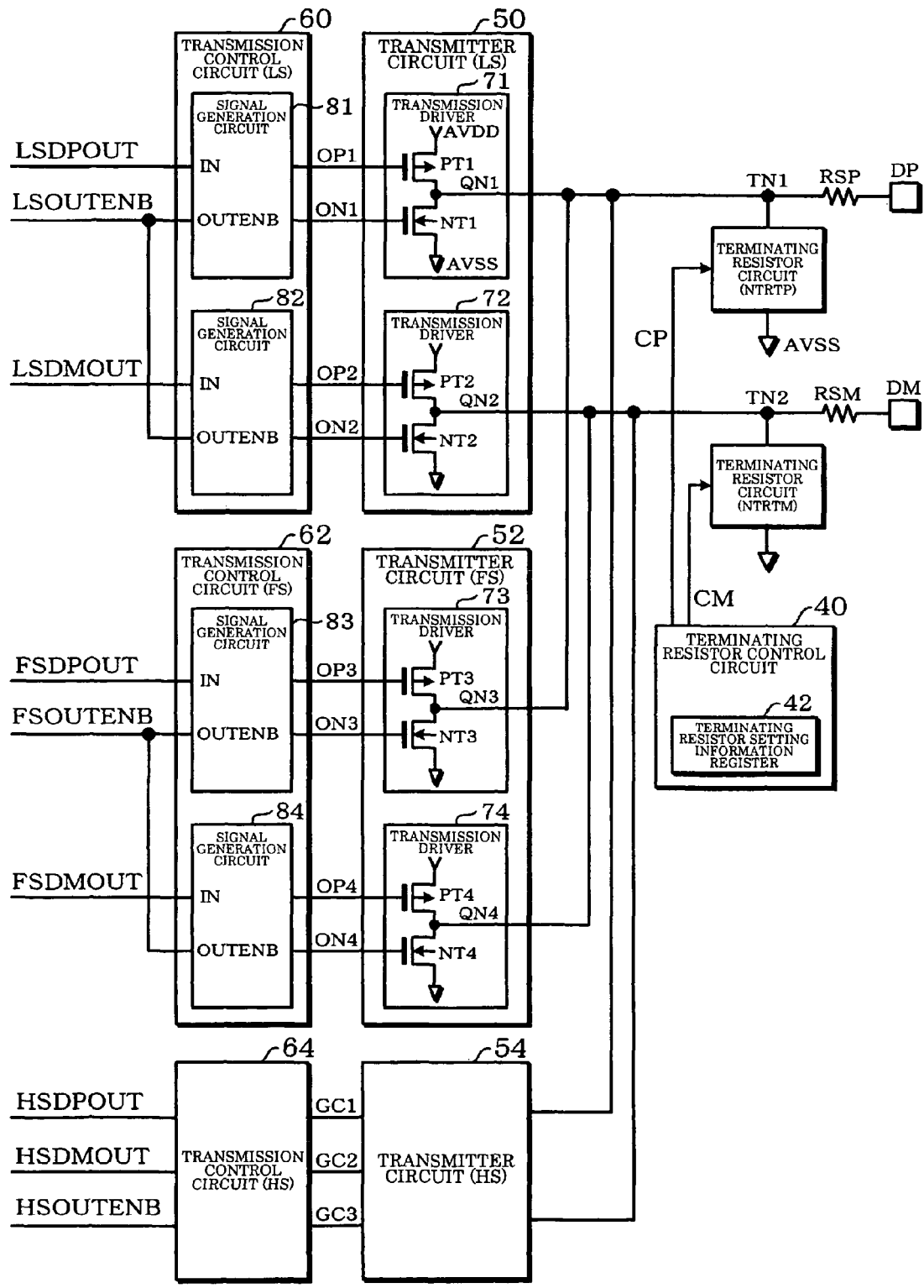
FIG. 10 shows another configuration example of a transmitter circuit and a transmission control circuit.

As shown in FIG. 10, the integrated circuit device may further include a first terminating resistor circuit 30 provided between the node TN1 and the power supply AVSS, and a second terminating resistor circuit 32 provided between the node TN2 and the power supply AVSS. The terminating resistor circuits 30 and 32 are circuits for terminating the DP and DM signal lines during HS data transfer. The terminating resistances of the terminating resistor circuits 30 and 32 are variably controlled, for example.

As shown in FIG. 10, the integrated circuit device may include a terminating resistor control circuit 40. The terminating resistor control circuit 40 is a circuit for variably controlling (setting) the terminating resistances of the terminating resistor circuits 30 and 32, and includes a terminating resistor setting information register 42. In more detail, the terminating resistor control circuit 40 outputs resistor control signals CP (CP1 to CP3) and CM (CM1 to CM3) to the terminating resistor circuits 30 and 32. The voltage levels of the resistor control signals CP and CM are set based on setting information (setting value) set in the terminating resistor setting information register 42. The setting information may be written into the terminating resistor setting information register 42 by firmware (processing section or CPU), for example.

In FIG. 10, the resistors RSP and RSM are used as LS and FS damping resistors in the LS and FS modes by turning OFF transistors forming resistors of the terminating resistor circuits 30 and 32, for example. In the HS mode, a resistor formed of the resistor RSP and the terminating resistor circuit 30 and a resistor formed of the resistor RSM and the terminating resistor circuit 32 can be utilized as an HS terminating resistor by disabling the LS and FS transmitter circuits 50 and 52. This allows the resistors RSP and RSM to be utilized in common in the LS and FS modes and the HS mode, whereby the circuit scale can be reduced.

Figure 11:
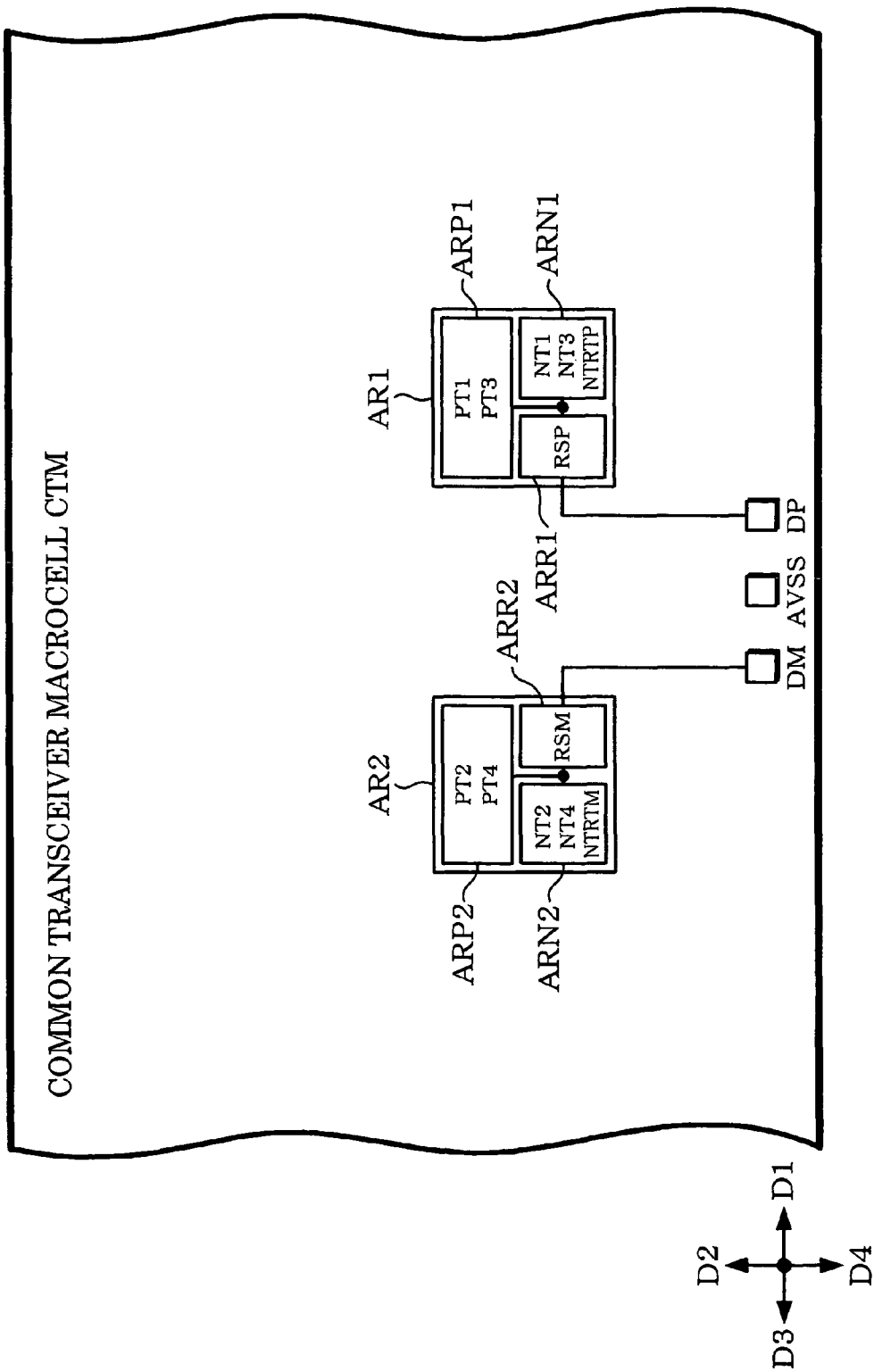

FIG. 11 shows a layout example of the LS and FS transmitter circuits 50 and 52 and the like. In FIG. 11, the DP-side circuits are disposed in a first area AR1, and the DM-side circuits are disposed in a second area AR2. The areas AR1 and AR2 are disposed symmetrically with respect to a line extending along the direction D2 in FIG. 11 as the symmetry axis, for example.

The DP-side area AR1 includes a first P-type transistor area ARP1 and a first N-type transistor area ARN1. The DP-side area AR1 also includes a first resistor area ARR1. The areas ARP1 and ARN1 are adjacently formed, and the areas ARN1 and ARR1 are also adjacently formed.

The DM-side area AR2 includes a second P-type transistor area ARP2 and a second N-type transistor area ARN2. The DM-side area AR2 also includes a second resistor area ARR2. The areas ARP2 and ARN2 are adjacently formed, and the areas ARN2 and ARR2 are also adjacently formed.

In this embodiment, the P-type transistor PT1 forming the LS DP-side transmission driver 71 and the P-type transistor PT3 forming the FS DP-side transmission driver 73 shown in FIGS. 9 and 10 are formed in the P-type transistor area ARP1, as shown in FIG. 11. The N-type transistor NT1 forming the LS DP-side transmission driver 71 and the N-type transistor NT3 forming the FS DP-side transmission driver 73 are formed in the N-type transistor area ARN1.

The P-type transistor PT2 forming the LS DM-side transmission driver 72 and the P-type transistor PT4 forming the FS DM-side transmission driver 74 are formed in the P-type transistor area ARP2. The N-type transistor NT2 forming the LS DM-side transmission driver 72 and the N-type transistor NT4 forming the FS DM-side transmission driver 74 are formed in the N-type transistor area ARN2.

In this embodiment, the P-type transistor forming the LS transmission driver and the P-type transistor forming the FS transmission driver are collectively formed in a single P-type transistor area. The N-type transistor forming the LS transmission driver and the N-type transistor forming the FS transmission driver are collectively formed in a single N-type transistor area.

In FIG. 11, the damping resistor RSP shown in FIGS. 9 and 10 is formed in the resistor area ARR1 adjacent to the N-type transistor area ARN1. The damping resistor RSM is formed in the resistor area ARR2 adjacent to the N-type transistor area ARN2. The damping resistors RSP and RSM may be formed using an N-type diffusion layer (N+ diffusion layer or active region), for example.

In FIG. 11, the N-type transistor NTRTP forming the DP-side terminating resistor circuit 30 shown in FIG. 10 is formed in the DP-side N-type transistor area ARN1. The N-type transistor NTRTM forming the DM-side terminating resistor circuit 32 is formed in the DM-side N-type transistor area ARN2.

Figure 12:
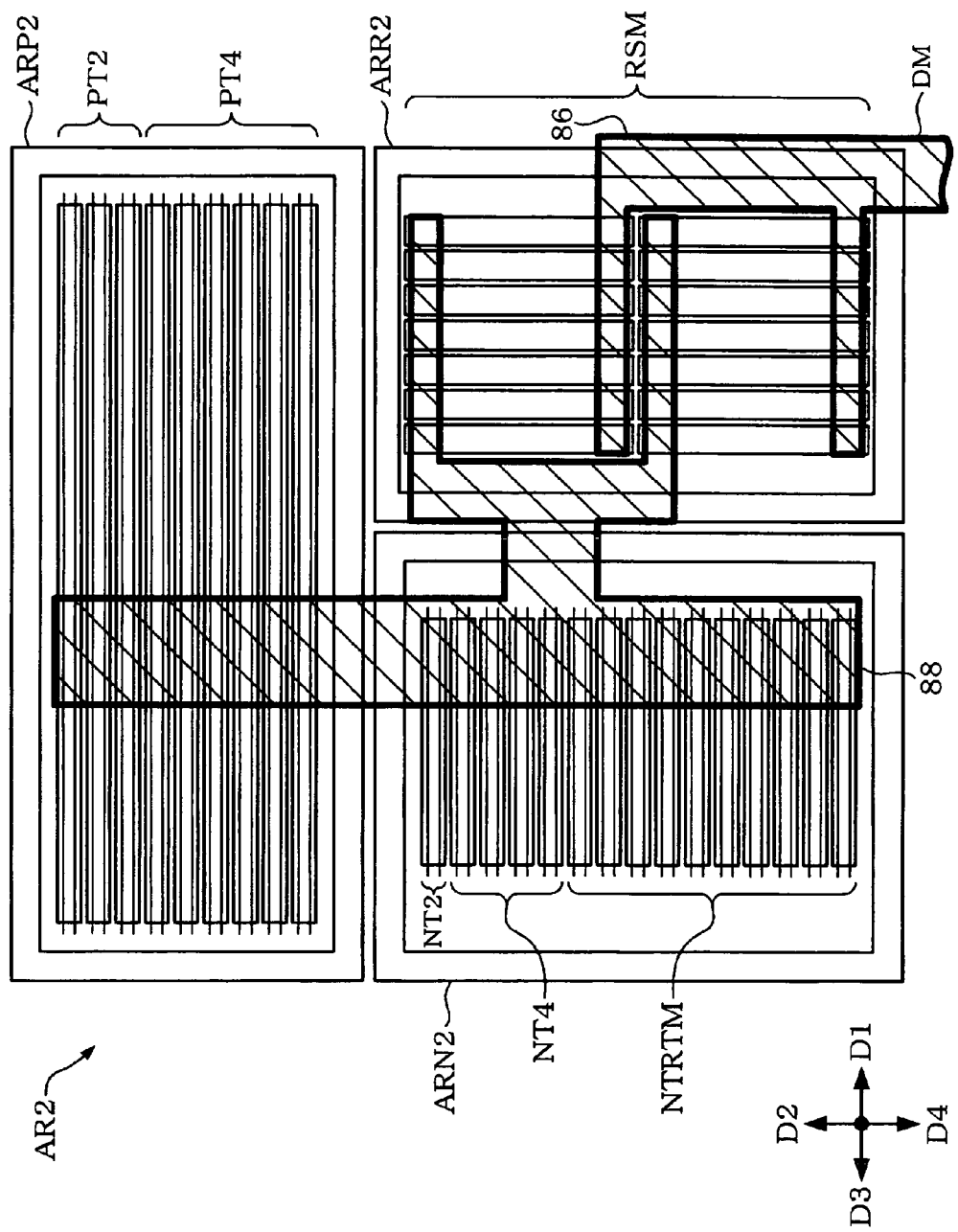

FIG. 12 shows a detailed layout example of the area AR2. The layout of the area AR1 is similar to that shown in FIG. 12. As shown in FIG. 12, the P-type transistor PT2 of the LS transmission driver 72 and the P-type transistor PT4 of the FS transmission driver 74 are adjacently disposed in the P-type transistor area ARP2 along the direction D2. The N-type transistor NT2 of the LS transmission driver 72 and the N-type transistor NT4 of the FS transmission driver 74 are adjacently disposed in the N-type transistor area ARN2 along the direction D2. The N-type transistors NT2 and NT4 and the N-type transistor NTRTM forming the terminating resistor circuit 32 shown in FIG. 10 are adjacently disposed along the direction D2. The damping resistor RSM formed using an N-type diffusion region (N+ diffusion region) is formed in the resistor area ARR2.

A signal line 86 from the DM pad is connected with one end of the damping resistor RSM in the resistor area ARR2. A signal line 88 connected with the other end of the damping resistor RSM is connected with the drains of the transistors PT2, PT4, NT2, and NT4.

In the USB 2.0 standard, the extremely high-speed HS transmitter circuit 54 is provided, as shown in FIGS. 9 and 10. The transmitter circuit 54 current-drives the DP and DM signal lines. Therefore, when a transmitter circuit with a configuration in which a large capacitor is added to the output node of the transmitter circuit is employed as the LS transmitter circuit, it is necessary to charge and discharge the large capacitor in the HS mode, whereby it becomes difficult to achieve HS high-speed data transfer. Moreover, a problem occurs in which the circuit scale of the transmitter circuit is increased or the control becomes complicated.

In the LS transmitter circuit 50 shown in FIGS. 9 and 10, a large capacitor is not added to the nodes TN1 and TN2. Therefore, the HS transfer using the HS transmitter circuit 54 can be prevented from being adversely affected. Moreover, since the LS transmitter circuit 50 can be realized using a configuration similar to that of the FS transmitter circuit 52, the circuit scale of the LS transmitter circuit 50 can be significantly reduced. This allows the LS transmitter circuit 50 to be disposed in a free space in the macrocell CTM, whereby the layout area of the integrated circuit device can be reduced. In particular, the transistors forming the LS transmitter circuit 50 and the transistors forming the FS transmitter circuit 52 are collectively formed in the areas AR1 and AR2, as shown in FIG. 11. Therefore, an increase in the circuit area due to the provision of the LS transmitter circuit 50 can be minimized.

In FIGS. 9 to 12, the damping resistors RSP and RSM are provided in the integrated circuit device. Note that a modification is also possible in which the damping resistors RSP and RSM are omitted from the integrated circuit device. In this case, the damping resistors RSP and RSM may be provided using external parts.

In FIGS. 10 to 12, the terminating resistor circuits 30 and 32 and the terminating resistor control circuit 40 are provided in the integrated circuit device. Note that a configuration may also be employed in which these circuits are omitted. In this case, the FS transmitter circuit 52 may drive the DP and DM signal lines at "0" in the HS mode, and the damping resistors RSP and RSM may be allowed to function as the terminating resistors.

In FIGS. 11 and 12, the P-type transistor area ARP1 is adjacent to the N-type transistor area ARN1, and the P-type transistor area ARP2 is adjacent to the N-type transistor area ARN2. Note that a modification is also possible in which these areas are not adjacently formed. For example, the resistor area ARR1 may be formed between the P-type transistor area ARP1 and the N-type transistor area ARN1, or the resistor area ARR2 may be formed between the P-type transistor area ARP2 and the N-type transistor area ARN2.

Figures 13A, 13B:
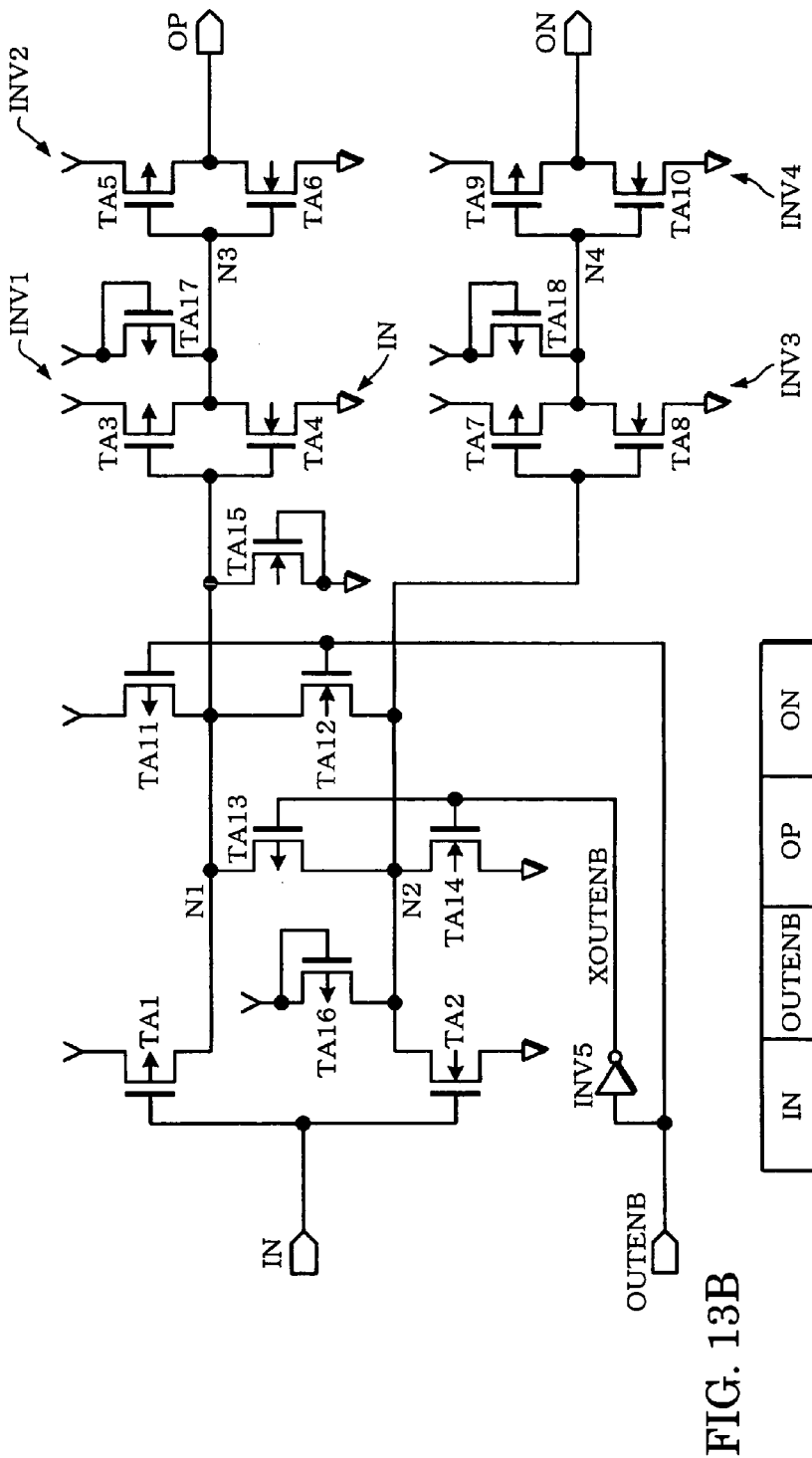
FIGS. 13A and 13B show a configuration of a signal generation circuit of a transmission control circuit and a truth table.

FIG. 13A shows a detailed configuration example of the signal generation circuits 81, 82, 83, and 84 included in the transmission control circuits 60 and 62. FIG. 13B shows a truth table of the signal generation circuit shown in FIG. 13A.

When the signal OUTENB is set at the H (high) level, transistors TA12 and TA13 are turned ON, whereby nodes N1 and N2 are connected through the transistors TA12 and TA13. When the signal IN is set at the L (low) level, a transistor TA1 is turned ON, whereby the nodes N1 and N2 are set at the H level. Therefore, the transmission control signals OP and ON output from inverters INV2 and INV4 are set at the H level. When the signals OP and ON are set at the H level, the output from the transmission driver to which the signals OP and ON are input is set at the L level, as shown in FIG. 9.

When the signal IN is set at the H level, a transistor TA2 is turned ON, whereby the nodes N1 and N2 are set at the L level. Therefore, the signals OP and ON are set at the L level. When the signals OP and ON are set at the L level, the output from the transmission driver to which the signals OP and ON are input is set at the H level, as shown in FIG. 9.

When the signal OUTENB is set at the L level, transistors TA11 and TA14 are turned ON, whereby the nodes NI and N2 are set at the H level and the L level, respectively. Therefore, the signals OP and ON are respectively set at the H level and the L level. This causes the output from the transmission driver to which the signals OP and ON are input to be set in a high impedance state, as shown in FIG. 9.

Figure 14A:
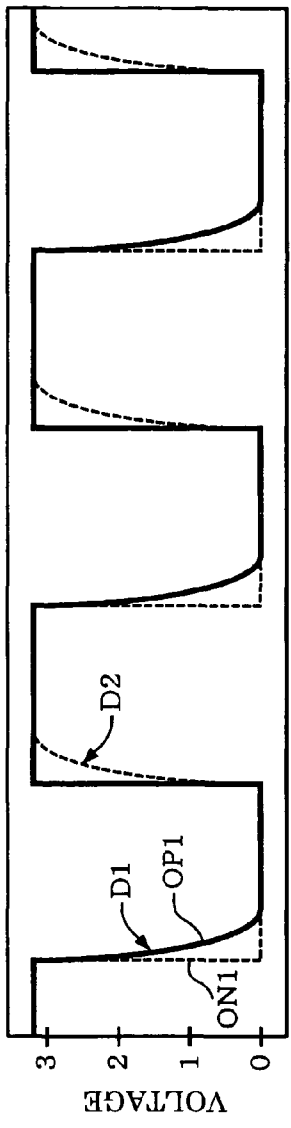
Figure 14B:
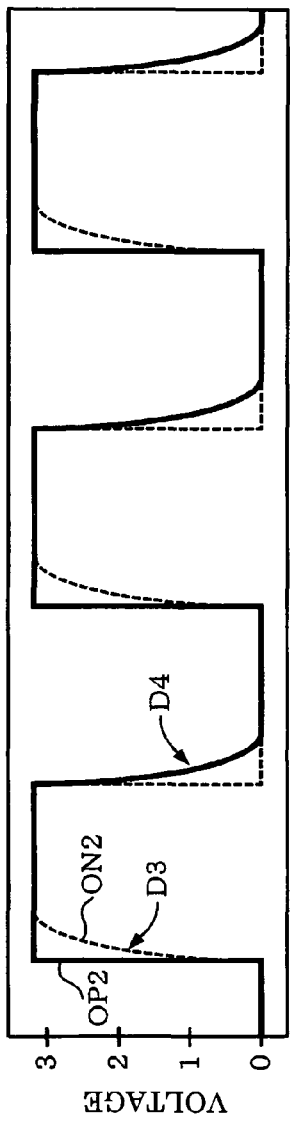
Figure 14C:
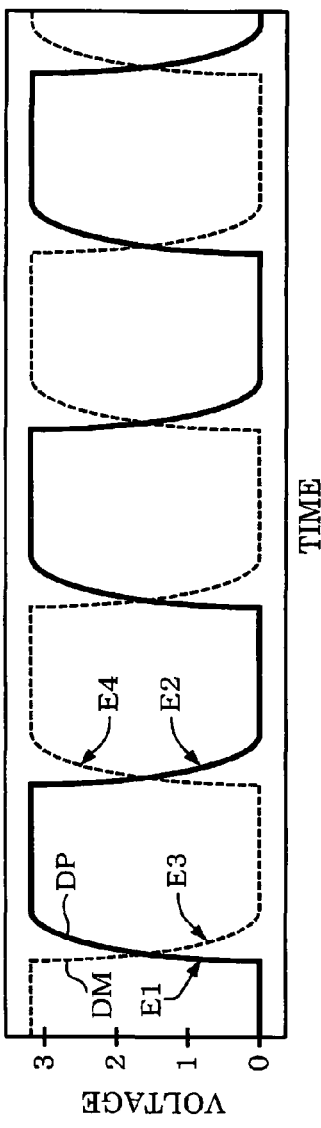

FIGS. 14A and 14B show waveform examples of the transmission control signals OP1, ON1, OP2, and ON2 input to the LS transmission drivers 71 and 72, and FIG. 14C shows a waveform example of the output signals DP and DM from the LS transmission drivers 71 and 72.

As shown in FIGS. 14A and 14B, the signals OP1 and OP2 have waveforms with a long fall time and a short rise time. This is realized by reducing the size (W/L and current supply capability) of an N-type transistor TA6 shown in FIG. 13A and increasing the size of a P-type transistor TA5. On the other hand, the signals ON1 and ON2 have waveforms with a long rise time and a short fall time. This is realized by reducing the size of a P-type transistor TA9 shown in FIG. 13A and increasing the size of an N-type transistor TA10.

The rise time of the signal DP can be increased, as indicated by E1 in FIG. 14C, by increasing the fall time of the signal OP1, as indicated by D1 in FIG. 14A. The fall time of the signal DP can be increased, as indicated by E2 in FIG. 14C, by increasing the rise time of the signal ON1, as indicated by D2 in FIG. 14A. Therefore, the rise time and the fall time of the signal DP can be increased.

The fall time of the signal DM can be increased, as indicated by E3 in FIG. 14C, by increasing the rise time of the signal ON2, as indicated by D3 in FIG. 14B. The rise time of the signal DM can be increased, as indicated by E4 in FIG. 14C, by increasing the fall time of the signal OP2, as indicated by D4 in FIG. 14B. Therefore, the rise time and the fall time of the signal DM can be increased.

According to this embodiment, the rise time and the fall time of the signals DP and DM can be increased by merely changing the size of the transistors TA5, TA6, TA9, TA10 and the like shown in FIG. 13A. Therefore, the rise time and the fall time of the signals DP and DM can be easily adjusted within the range of 75 to 300 ns with respect to the load capacitance within the range of 50 to 350 pf, whereby it is possible to follow the USB standard in the LS mode. Moreover, since the load capacitances of the output nodes QN1 and QN2 of the transmission drivers 71 and 72 do not change even if the size of the transistors TA5, TA6, TA9, and TA10 is changed, the HS mode data transfer using the transmitter circuit 54 can be prevented from being adversely affected.

5. HS Transmitter Circuit

Figure 15:
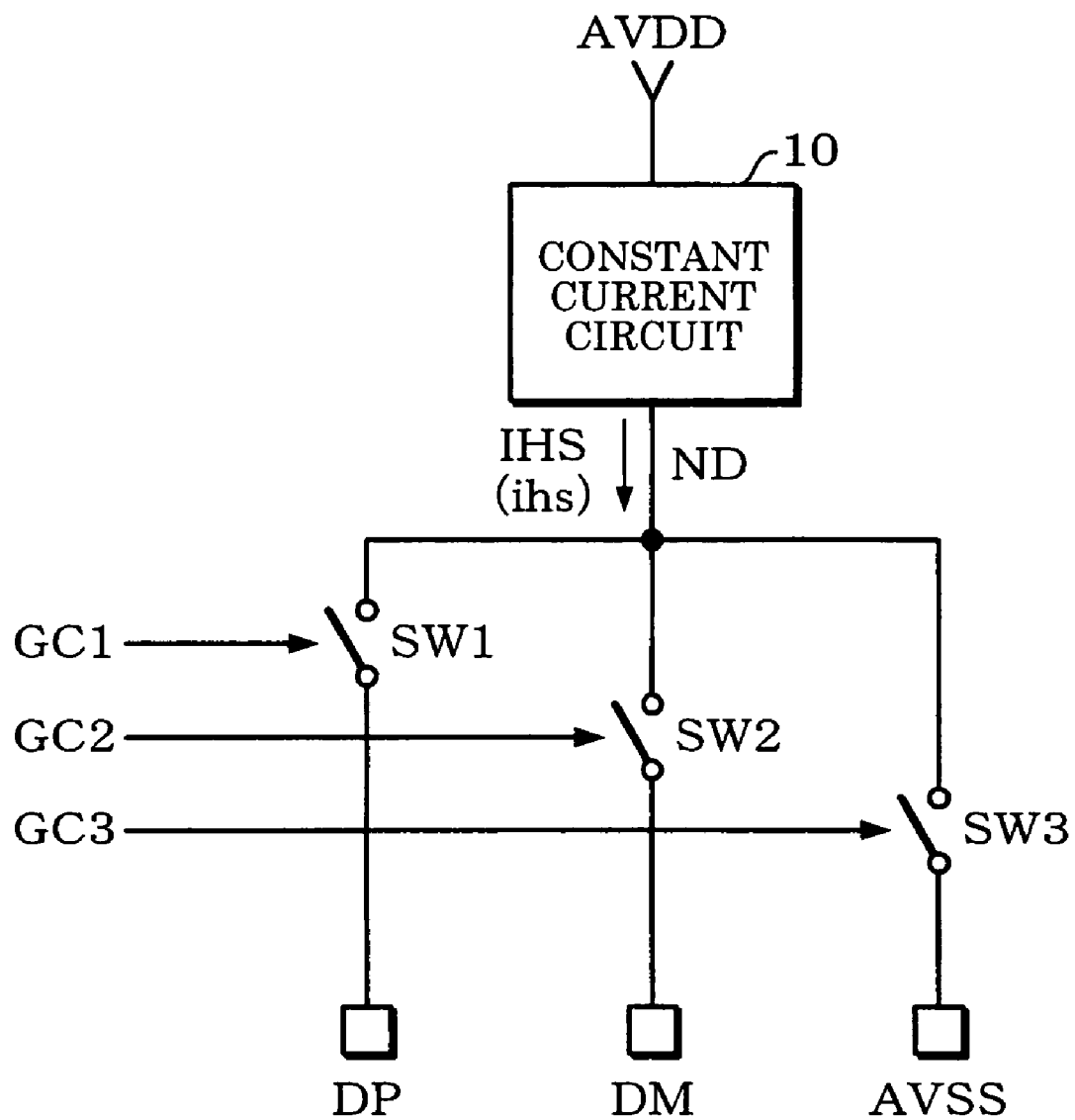
FIG. 15 shows a configuration example of an HS transmitter circuit.

FIG. 15 shows a configuration example of the HS transmitter circuit 54 (current driver). The HS transmitter circuit 54 includes a constant current circuit 10 and first to third switch elements SW1, SW2, and SW3.

The constant current circuit 10 (current source or current circuit) is provided between the power supply AVDD and a node ND. The switch element SW1 is provided between the node ND and the DP signal line. The switch element SW2 is provided between the node ND and the DM signal line. The switch element SW3 is provided between the node ND and the power supply AVSS. The switch elements SW1, SW2, and SW3 may be formed using transistors (CMOS transistors or N-type transistors), and ON-OFF controlled using the transmission control signals GC1, GC2, and GC3.

The HS transmitter circuit 54 drives (current-drives) the DP or DM signal line through the switch element SW1 or SW2 using current from the constant current circuit 10. In more detail, the switch elements SW1, SW2, and SW3 are ON-OFF controlled based on the transmission control signals GC1, GC2, and GC3 from the transmission control circuit 64 shown in FIG. 9, whereby the DP and DM signal lines are driven.

A current control circuit which variably controls the value of current from the constant current circuit 10 may be further provided. This enables adjustment of the output high level voltage of the signals DP and DM. It is also possible to provide a first buffer circuit which outputs a first transmission control signal to the gate of the transistor forming the switch element SW1 and a second buffer circuit which outputs a second transmission control signal to the gate of the transistor forming the switch element SW2. Each of the first and second buffer circuits may include a first inverter, a second inverter of which the input node is connected with the output node of the first inverter, and a capacitance adjustment circuit connected with the output node of the first inverter. This allows adjustment of the slew rate of the output from the HS transmitter circuit 54.

6. Terminating Resistor Circuit

Figure 16:
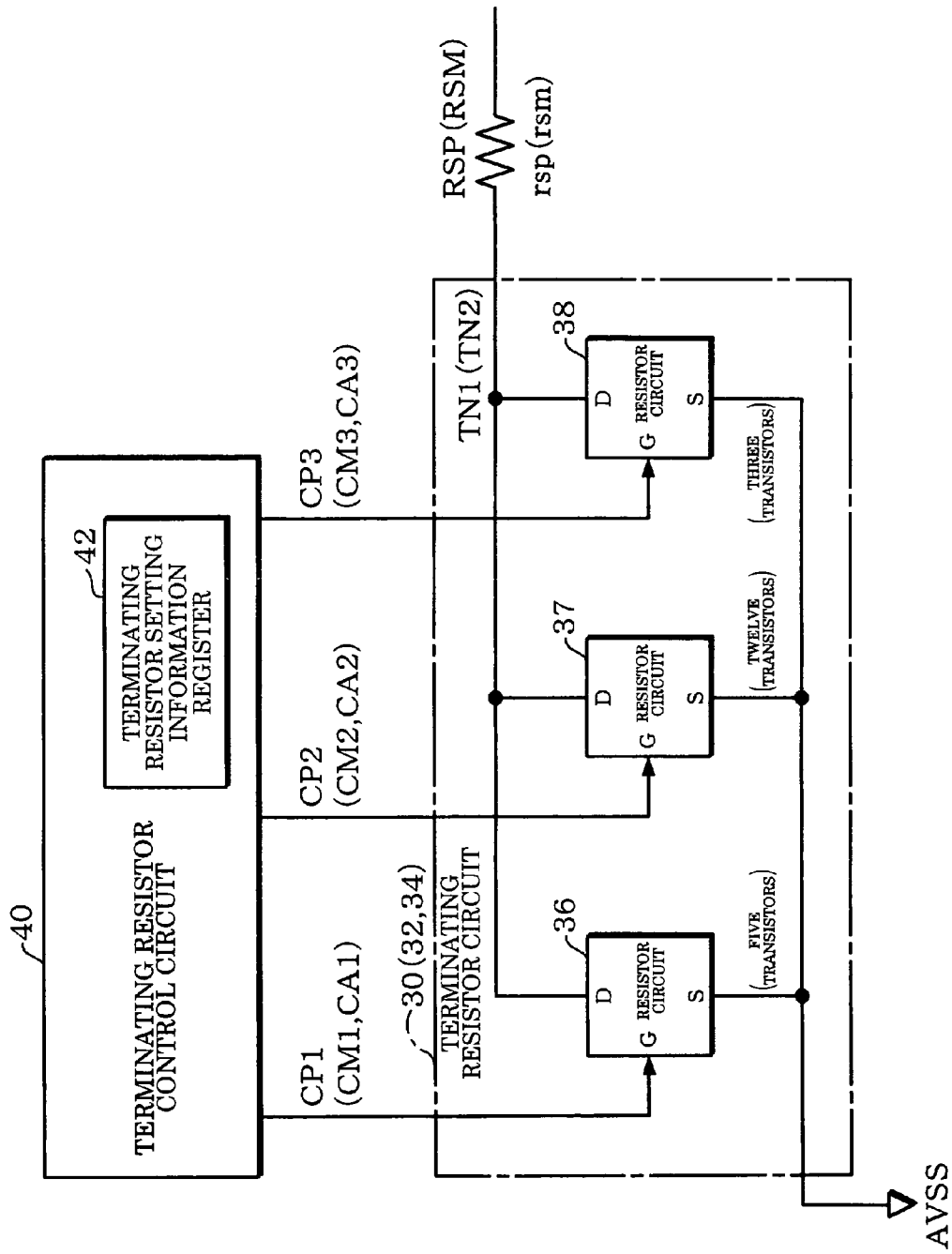
FIG. 16 shows a configuration example of a terminating resistor circuit.

FIG. 16 shows a configuration example of the terminating resistor circuit 30 shown in FIG. 10. The terminating resistor circuits 32 and 34 have a configuration similar to that shown in FIG. 16.

Figure 17A:
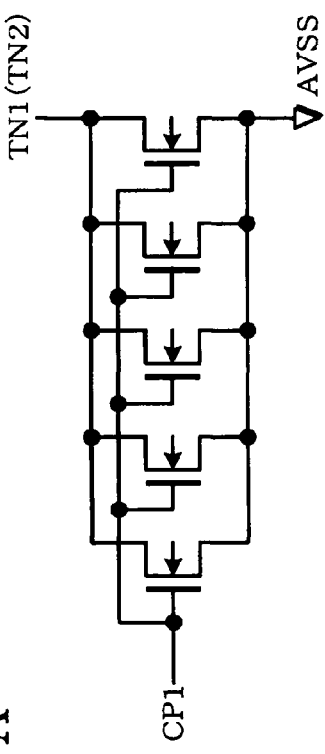
FIGS. 17A, 17B, and 17C show configuration examples of examples of N-type transistors forming a resistor circuit.
Figure 17B:
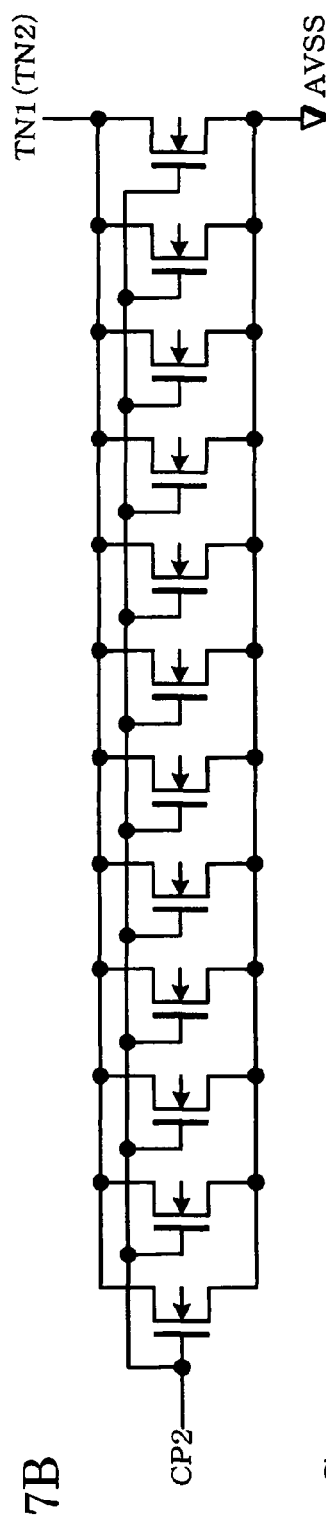
Figure 17C:
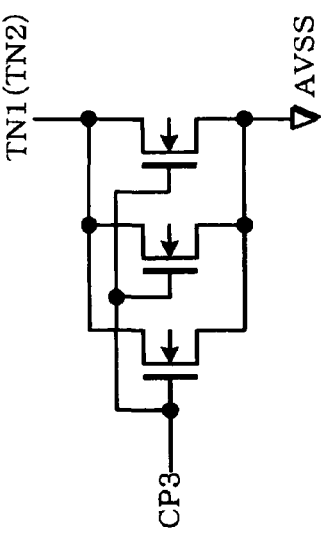

The terminating resistor circuit 30 includes resistor circuits 36, 37, and 38. Each of the resistor circuits 36, 37, and 38 includes a plurality of transistors. In more detail, as shown in FIGS. 17A, 17B, and 17C, the resistor circuits 36, 37, and 38 respectively include five, twelve, and three parallel-connected N-type transistors, for example. These N-type transistors are the transistors NTRTP and NTRTM formed in the N-type transistor areas ARN1 and ARN2 in FIGS. 11 and 12. The node TN1 is connected with the drains of the N-type transistors, and the power supply AVSS is connected with the sources of the N-type transistors. The resistor control signals CP1, CP2, and CP3 from the terminating resistor control circuit 40 are input to the gates of the N-type transistors forming the resistor circuits 36, 37, and 38, respectively. When the resistor control signals CP1, CP2, and CP3 are set to active, the N-type transistors forming the resistor circuits 36, 37, and 38 are turned ON. The resistances (terminating resistances) of the resistor circuits 36, 37, and 38 are determined by the ON resistances of the N-type transistors.

For example, when the resistor control signals CP1 to CP3 are set to active, the twenty (=5+12+3) parallel-connected transistors forming the resistor circuits 36, 37, and 38 are turned ON. The parallel resistance formed by the ON resistances of these transistors is 2.4 ohms, for example. Since the fixed resistance of the resistor RSP is rsp=39 ohms, the terminating resistance is 41.4 ohms.

When the resistor control signals CP1 and CP3 are set to active and the resistor control signal CP2 is set to inactive, the eight (=5+3) parallel-connected transistors forming the resistor circuits 36 and 38 are turned ON. The parallel resistance formed by the ON resistances of these transistors is 6.0 ohms, for example. Therefore, the terminating resistance is 39+6.0=45 ohms.

When the resistor control signal CP1 is set to active and the resistor control signals CP2 and CP3 are set to inactive, the five parallel-connected transistors forming the resistor circuit 36 are turned ON. The parallel resistance formed by the ON resistances of these transistors is 9.6 ohms, for example. Therefore, the terminating resistance is 39+9.6=48.6 ohms.

As described above, the terminating resistances of the DP and DM signal lines can be variably controlled in FIGS. 10 and 16. This enables adjustment of the output high level voltage of the signals DP and DM. Moreover, an impedance matching can be achieved by changing the transmitter-side terminating resistance when an impedance matching between the transmitter-side terminating resistance and the receiver-side terminating resistance is not achieved.

7. Receiver Circuit and Detection Circuit

Figure 18:
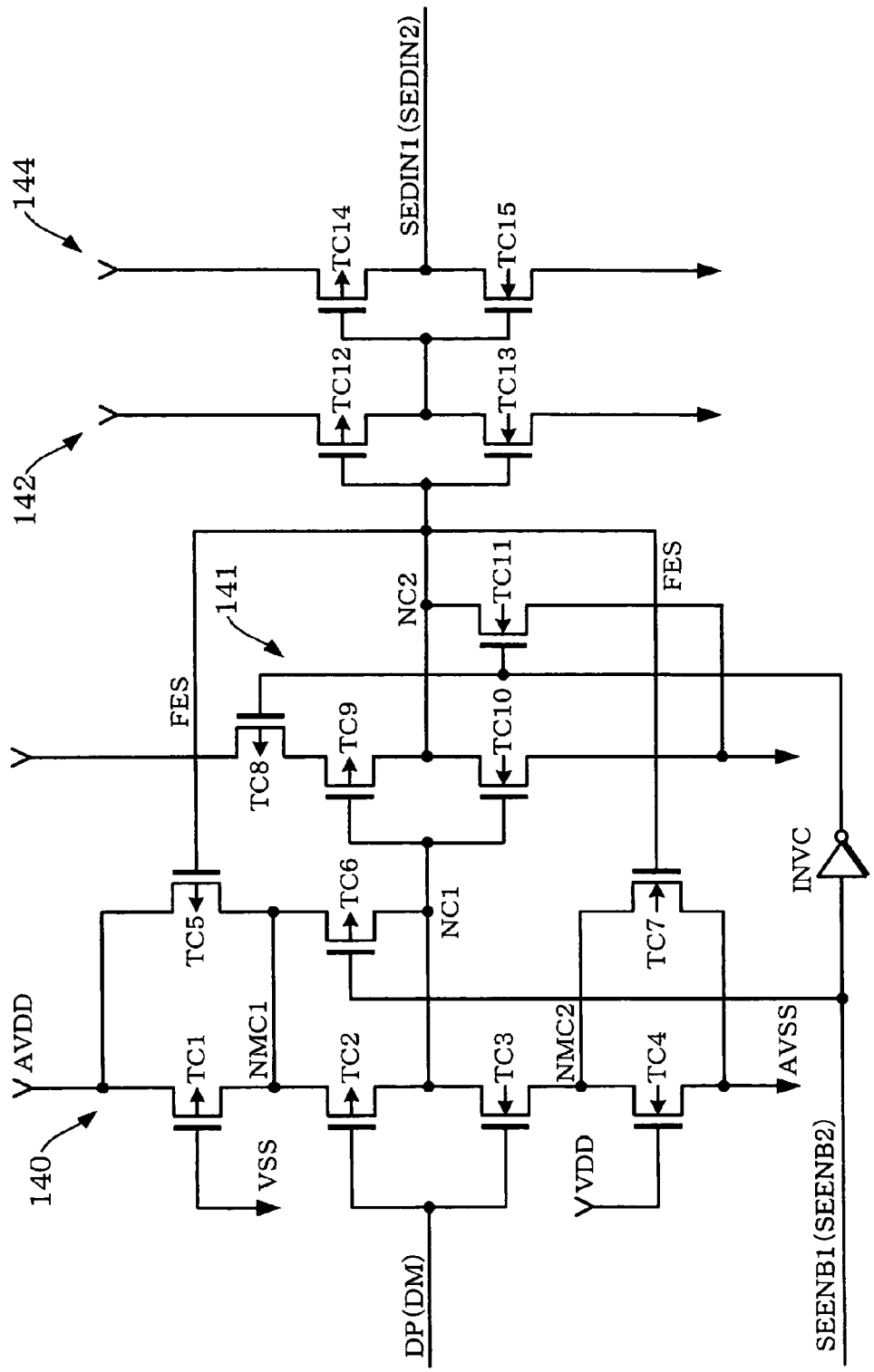
FIG. 18 shows a configuration example of a single-ended receiver circuit.

FIG. 18 shows a configuration example of the single-ended receiver circuit 56 shown in FIG. 4. Note that the receiver circuit 58 has a configuration similar to that shown in FIG. 18. The receiver circuit 56 includes a first inverter 140 to which the signal DP (DM) is input, and a second inverter 141 connected with an output node NC1 of the first inverter 140 at its input. The receiver circuit 56 also includes third and fourth inverters 142 and 144.

In FIG. 18, when the signal DP is set at the L level, the voltage of the output node NC2 is set at the L level. This causes a transistor TC5 to be turned ON, whereby the on-resistance of the P-type transistor is decreased. This increases the threshold voltage when the signal DP (DM) changes from the L level to the H level. When the signal DP (DM) is set at the H level, the voltage of the output node NC2 is set at the H level. This causes a transistor TC7 to be turned ON, whereby the on-resistance of the N-type transistor is decreased. This decreases the threshold voltage when the signal DP (DM) changes from the H level to the L level. The threshold voltage hysteresis characteristics are realized in this manner.

In FIG. 18, a transistor TC6 is turned ON when an enable signal SEENB1 (SEENB2) is set at the L level (inactive), whereby the output node NC1 of the inverter 140 is set at the H level (AVDD). A transistor TC11 is also turned ON, whereby the output node NC2 of the inverter 141 is set at the L level (AVSS). A transistor TC8 is turned OFF, whereby current which flows through the path formed of the transistors TC8, TC9, and TC10 of the inverter 141 is terminated.

The DP and DM signal lines are in a floating state in which no signal is supplied before a USB cable is connected. Therefore, if the signals DP and DM signal lines in the floating state are connected with the transistors TC2 and TC3 of the inverter 140, a shoot-through current may occur in the inverter 140. In FIG. 18, when the enable signal SEENB1 (SEENB2) is set at the L level, the output nodes NC1 and NC2 of the inverters 140 and 141 are set at the power supply voltages (AVDD and AVSS). Therefore, a problem in which a shoot-through current occurs in the inverters 140, 141, 142, and 144 can be prevented by setting the enable signals SEENB1 and SEENB2 at the L level before a USB cable is connected.

Figure 19:
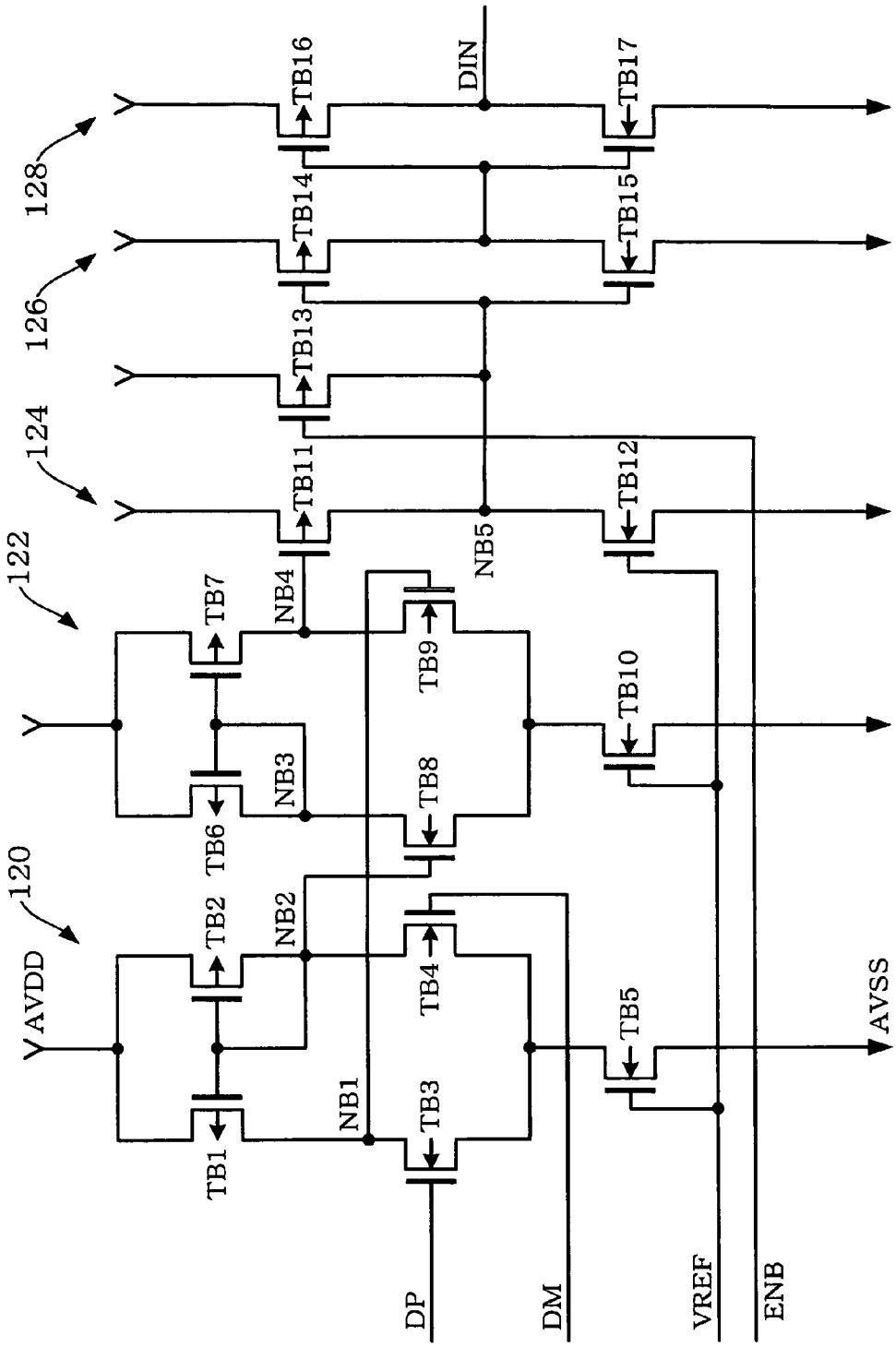
FIG. 19 shows a configuration example of FS and HS receiver circuits.

FIG. 19 shows a configuration example of the FS receiver circuit 90 (differential receiver) shown in FIG. 4. The HS receiver circuit 92 has a configuration similar to that shown in FIG. 19.

The receiver circuit 90 includes operational amplifier circuits 120 and 122, an output circuit 124, and inverters 126 and 128. The signals DP and DM are input to the gates of transistor TB3 and TB4 which are first and second differential inputs of the operational amplifier circuit 120. Output signals from output nodes NB2 and NB1 of the operational amplifier circuit 120 are input to the gates of transistors TB8 and TB9 which are first and second differential inputs of the operational amplifier circuit 122. An output signal from an output node NB4 of the operational amplifier circuit 122 is input to the gate of a transistor TB11 of the output circuit 124. An output signal from an output node NB5 of the output circuit 124 is buffered by an inverter 128 formed of an inverter 126 including transistors TB14 and TB15 and transistors TB16 and TB17, and output as a signal DIN.

In FIG. 19, when an enable signal ENB is set at the L level (AVSS), a reference voltage VREF is also set at the L level. This causes current source transistors TB5, TB10, and TB12 to be turned OFF, whereby power consumption can be reduced. Since a transistor TB13 is turned ON, the output node NB5 of the output circuit 124 is set at the H level (AVDD), whereby a problem can be prevented in which a shoot-through current occurs in the inverters 126 and 128.

Figure 20:
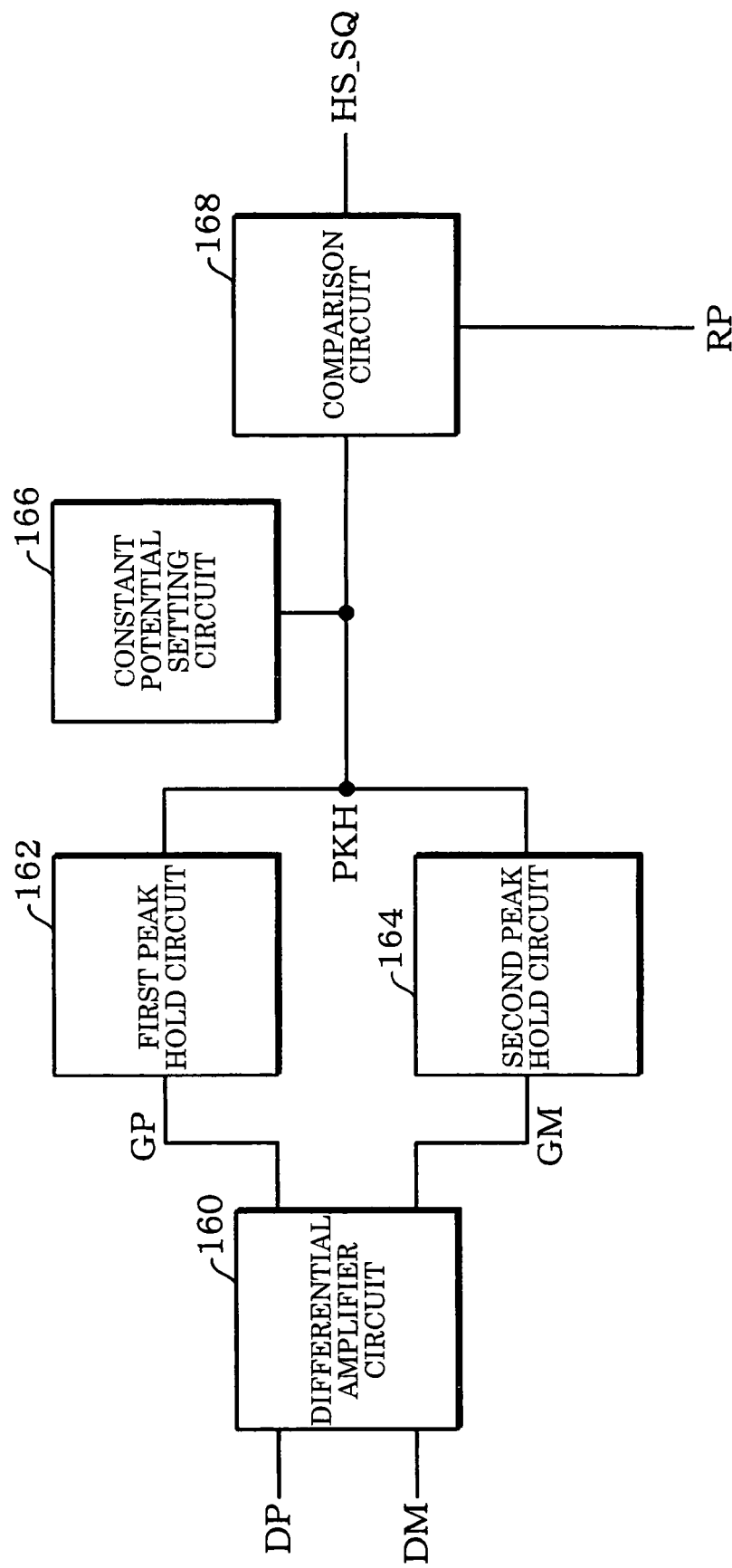
FIG. 20 shows a configuration example of squelch and disconnection detection circuits.

FIG. 20 shows a configuration example of the squelch detection circuit 94 shown in FIG. 4. The disconnection detection circuit 96 has a configuration similar to that shown in FIG. 20. The detection circuit 94 includes a differential amplifier circuit 160, first and second peak hold circuits 162 and 164, a constant potential setting circuit 166, and a comparison circuit 168. The differential amplifier circuit 160 amplifies the differential voltage between the signals DP and DM, and generates differential output signals GP and GM. The first peak hold circuit 162 detects the peak value of the differential output signal GP, and holds the peak value at a node PKH. The second peak hold circuit 164 detects the peak value of the other differential output signal GM, and holds the peak value at the node PKH. The constant potential setting circuit 166 returns the potential of the node PKH to a constant potential corresponding to the signal undetected state at a time constant which causes a change slower than the potential change rate of the node PKH. The comparison circuit 168 compares a reference potential RP with the potential of the node PKH, and outputs the comparison result as a signal HS_SQ. As described above, the detection circuit 94 shown in FIG. 20 holds the peak values of the differential output signals GP and GM obtained based on the differential data signals DP and DM at the node PKH, and returns the potential of the node PKH to a constant potential associated with the signal undetected state at a low time constant. The detection circuit 94 then compares the potential of the node PKH with the reference level RP. Therefore, the detection circuit 94 can determine the presence or absence of received data with high accuracy, even if the differential data signals DP and DM have a small amplitude and are transmitted at a high speed.

Figure 21:
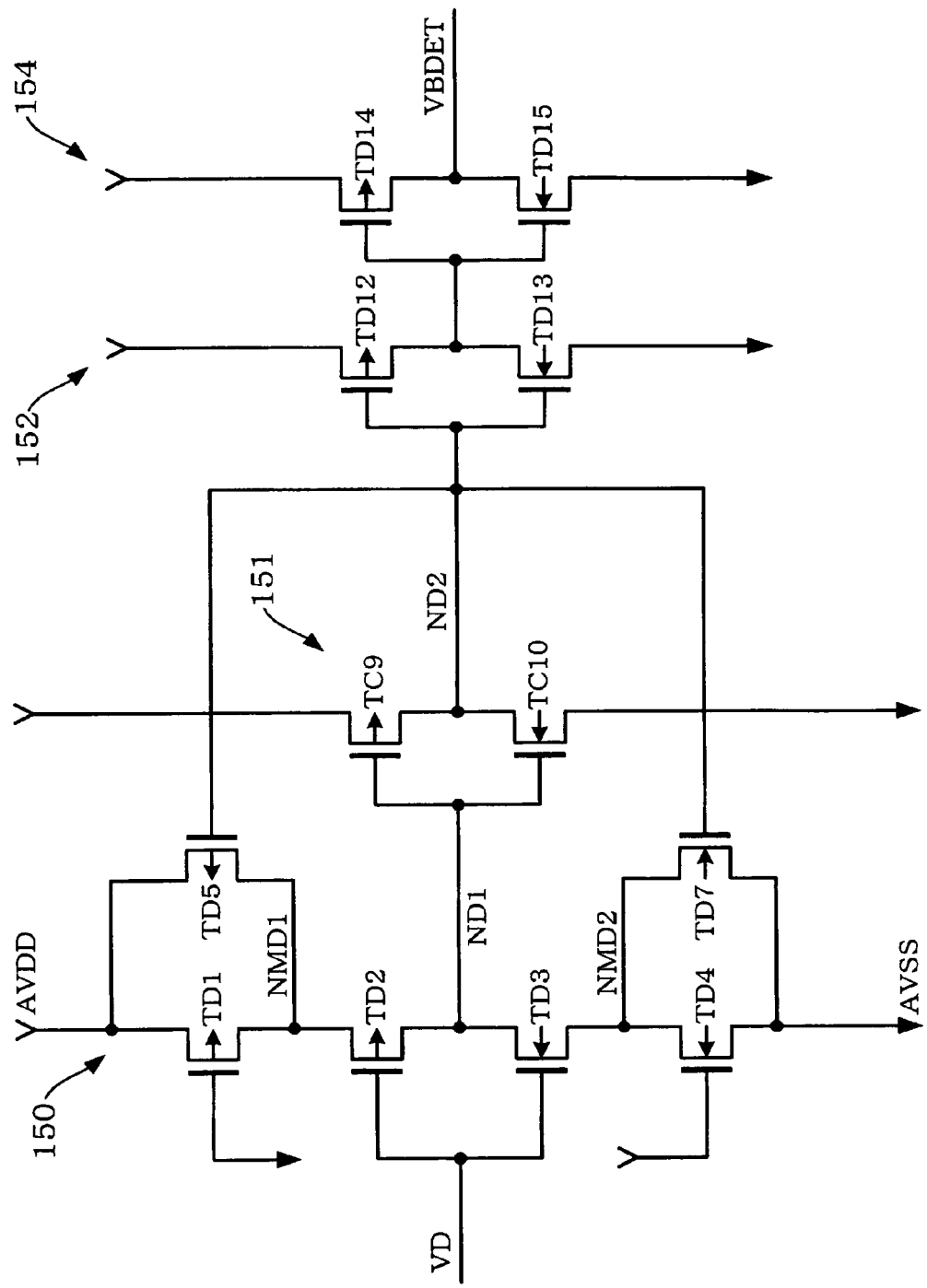
FIG. 21 shows a configuration example of a VBUS detection circuit.

FIG. 21 shows a configuration example of the detection circuit 98 shown in FIG. 4. The detection circuit 98 shown in FIG. 21 has approximately the same configuration as that of the single-ended receiver circuit 90 shown in FIG. 18. The detection circuit 98 differs from the single-ended receiver circuit 90 in that transistors corresponding to the transistors TC6, TC8, and TC11 shown in FIG. 18 are omitted in FIG. 21.

The signal noise tolerance is increased by using the detection circuit 98 having threshold voltage hysteresis characteristics shown in FIG. 21, whereby the VBUS voltage can be detected with higher reliability and certainty.

8. Electronic Instrument

Figure 22:
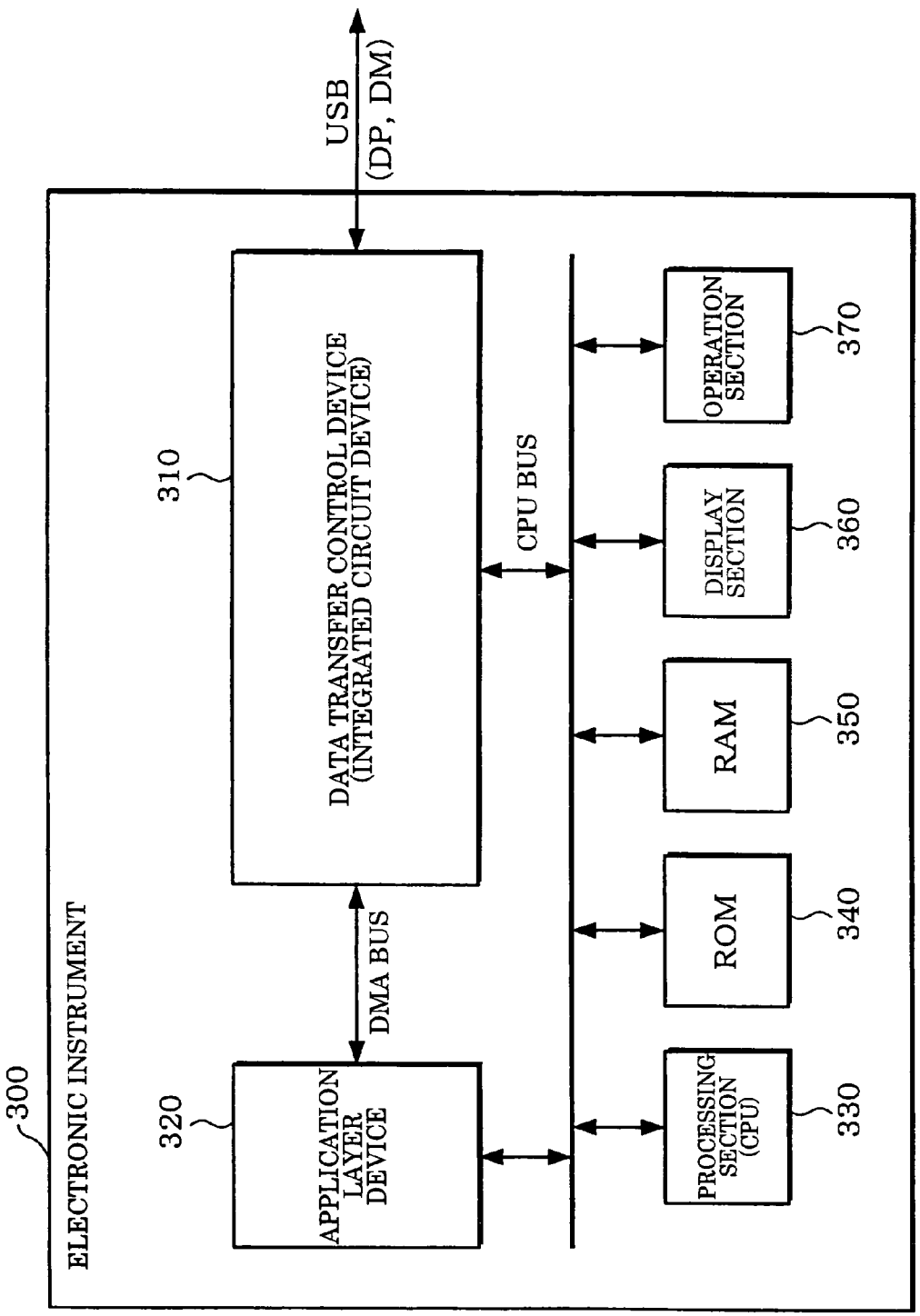
FIG. 22 shows a configuration example of an electronic instrument.

FIG. 22 shows a configuration example of an electronic instrument according to this embodiment. An electronic instrument 300 includes a data transfer control device 310 which is the integrated circuit device described in the above embodiment, an application layer device 320 formed of an ASIC or the like, a CPU 330, a ROM 340, a RAM 350, a display section 360, and an operation section 370. The electronic instrument 300 may have a configuration in which some of these functional blocks are omitted.

The application layer device 320 is a device which realizes an application engine of a portable telephone, a device which controls a drive of an information storage medium (hard disk or optical disk), a device which controls a printer, a device including an MPEG encoder and an MPEG decoder, or the like. The processing section 330 (CPU) controls the data transfer control device 310 and the entire electronic instrument. The ROM 340 stores a control program and various types of data. The RAM 350 functions as a work area and a data storage area for the processing section 330 and the data transfer control device 310. The display section 360 displays various types of information to the user. The operation section 370 allows the user to operate the electronic instrument.

In FIG. 22, a DMA bus and a CPU bus are separated. Note that these buses may be designed as one bus. A processing section which controls the data transfer control device 310 and a processing section which controls the electronic instrument may be separately provided.

As examples of the electronic instrument 300 according to this embodiment, a portable telephone, a portable music player, a portable image player, a video camera, a digital camera, an optical disk drive, a hard disk drive, an audio instrument, a portable game device, an electronic notebook, an electronic dictionary, a portable information terminal, and the like can be given.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g. AVDD, AVSS, DP, or DM) cited with a different term (e.g. first power supply, second power supply, first signal line, or second signal line) having a broader meaning or the same meaning at least once in the specification and the drawings can be replaced by the different term in any place in the specification and the drawings. The configurations and the operations of the integrated circuit device, the data transfer control device, and the electronic instrument are not limited to those described in the above embodiments. Various modifications and variations may be made. The above embodiments illustrate an example of applying the invention to the USB 2.0 standard. Note that the invention may also be applied to a standard based on the same idea as the USB 2.0 standard or a standard developed from the USB 2.0 standard.

What is claimed is:

1. An integrated circuit device comprising:
at least one common transceiver macrocell that transfers data through a serial bus and has a circuit necessary for host operation and a circuit necessary for device operation,
the common transceiver macrocell including:
an analog front-end circuit including a circuit that transmits and receives data through the serial bus; and
a logic circuit,
the logic circuit including:
a parallel/serial conversion circuit that converts parallel data from an external circuit of the common transceiver macrocell into serial data;
a first parallel interface that serves as an interface between the external circuit and the parallel/serial conversion circuit;
a sampling clock generation circuit that generates a sampling clock signal for sampling serial data received through the serial bus;
a serial/parallel conversion circuit that converts serial data received through the serial bus into parallel data; and
a second parallel interface that serves as an interface between the serial/parallel conversion circuit and the external circuit,
the analog front-end circuit including:
a first transfer mode transmitter circuit that transmits data through the serial bus in a first transfer mode;
a second transfer mode transmitter circuit that transmits data through the serial bus in a second transfer mode that is higher in speed than the first transfer mode;
a third transfer mode transmitter circuit that transmits data through the serial bus in a third transfer mode that is higher in speed than the second transfer mode;
a first single-ended receiver circuit connected with a first signal line of differential data signal lines making up the serial bus;
a second single-ended receiver circuit connected with a second signal line of the differential data signal lines;
a second transfer mode receiver circuit that receives data through the serial bus in the second transfer mode;
a third transfer mode receiver circuit that receives data through the serial bus in the third transfer mode;
a first detection circuit that detects whether data of the differential data signal lines is valid or invalid;
a second detection circuit that detects disconnection of the serial bus;
a pull-up circuit for pulling up the first signal line of the differential data signal lines;
a first pull-down circuit for pulling down the first signal line of the differential data signal lines; and
a second pull-down circuit for pulling down the second signal line of the differential data signal lines.

2. An integrated circuit device comprising:
at least one common transceiver macrocell that transfers data through a serial bus and has a circuit necessary for host operation and a circuit necessary for device operation,
the common transceiver macrocell including:
an analog front-end circuit including a circuit that transmits and receives data through the serial bus; and
a logic circuit,
the analog front-end circuit including:
a first transfer mode transmitter circuit that transmits data through the serial bus in a first transfer mode;
a second transfer mode transmitter circuit that transmits data through the serial bus in a second transfer mode that is higher in speed than the first transfer mode;
a third transfer mode transmitter circuit that transmits data through the serial bus in a third transfer mode that is higher in speed than the second transfer mode;
a first single-ended receiver circuit connected with a first signal line of differential data signal lines making up the serial bus;
a second single-ended receiver circuit connected with a second signal line of the differential data signal lines;
a second transfer mode receiver circuit that receives data through the serial bus in the second transfer mode;
a third transfer mode receiver circuit that receives data through the serial bus in the third transfer mode;
a first detection circuit that detects whether data of the differential data signal lines is valid or invalid;
a second detection circuit that detects disconnection of the serial bus;

a pull-up circuit for pulling up the first signal line of the differential data signal lines;
a first pull-down circuit for pulling down the first signal line of the differential data signal lines; and
a second pull-down circuit for pulling down the second signal line of the differential data signal lines.

3. The integrated circuit device as defined in claim 1,
the analog front-end circuit including:
a third detection circuit that monitors voltage of a power supply line making up the serial bus, and activates a detection signal when the voltage of the power supply line has exceeded a specific voltage.

4. The integrated circuit device as defined in claim 2,
the analog front-end circuit including:
a third detection circuit that monitors voltage of a power supply line making up the serial bus, and activates a detection signal when the voltage of the power supply line has exceeded a specific voltage.

5. The integrated circuit device as defined in claim 1,
the first transfer mode first transmitter circuit including a first transmission driver that drives the first signal line of the differential data signal lines and a second transmission driver that drives the second signal line of the differential data signal lines,
the second transfer mode second transmitter circuit including a third transmission driver that drives the first signal line of the differential data signal lines and a fourth transmission driver that drives the second signal line of the differential data signal lines,
a first P-type transistor forming the first transfer mode first transmission driver and a third P-type transistor forming the second transfer mode third transmission driver being formed in a first P-type transistor area,
a first N-type transistor forming the first transfer mode first transmission driver and a third N-type transistor forming the second transfer mode third transmission driver being formed in a first N-type transistor area,
a second P-type transistor forming the first transfer mode second transmission driver and a fourth P-type transistor forming the second transfer mode fourth transmission driver being formed in a second P-type transistor area, and
a second N-type transistor forming the first transfer mode second transmission driver and a fourth N-type transistor forming the second transfer mode fourth transmission driver being formed in a second N-type transistor area.

6. The integrated circuit device as defined in claim 2,
the first transfer mode first transmitter circuit including a first transmission driver that drives the first signal line of the differential data signal lines and a second transmission driver that drives the second signal line of the differential data signal lines,
the second transfer mode second transmitter circuit including a third transmission driver that drives the first signal line of the differential data signal lines and a fourth transmission driver that drives the second signal line of the differential data signal lines,
a first P-type transistor forming the first transfer mode first transmission driver and a third P-type transistor forming the second transfer mode third transmission driver being formed in a first P-type transistor area,
a first N-type transistor forming the first transfer mode first transmission driver and a third N-type transistor forming the second transfer mode third transmission driver being formed in a first N-type transistor area,
a second P-type transistor forming the first transfer mode second transmission driver and a fourth P-type transistor forming the second transfer mode fourth transmission driver being formed in a second P-type transistor area, and
a second N-type transistor forming the first transfer mode second transmission driver and a fourth N-type transistor forming the second transfer mode fourth transmission driver being formed in a second N-type transistor area.

7. The integrated circuit device as defined in claim 5,
the first P-type transistor area and the first N-type transistor area being adjacently formed, and
the second P-type transistor area and the second N-type transistor area being adjacently formed.

8. The integrated circuit device as defined in claim 5, comprising:
a first damping resistor provided between a first node connected with output nodes of the first and third transmission drivers and the first signal line; and
a second damping resistor provided between a second node connected with output nodes of the second and fourth transmission drivers and the second signal line,
the first damping resistor being formed in a first resistor area adjacent to the first N-type transistor area, and
the second damping resistor being formed in a second resistor area adjacent to the second N-type transistor area.

9. The integrated circuit device as defined in claim 5, comprising:
a first terminating resistor circuit provided between a first node connected with output nodes of the first and third transmission drivers and a second power supply; and
a second terminating resistor circuit provided between a second node connected with output nodes of the second and fourth transmission drivers and the second power supply,
an N-type transistor forming the first terminating resistor circuit being formed in the first N-type transistor area, and
an N-type transistor forming the second terminating resistor circuit being formed in the second N-type transistor area.

10. The integrated circuit device as defined in claim 1, comprising:
a setting information register in which information for setting whether to use the common transceiver macrocell as a host transceiver macrocell or a device transceiver macrocell is stored.

11. The integrated circuit device as defined in claim 2, comprising:
a setting information register in which information for setting whether to use the common transceiver macrocell as a host transceiver macrocell or a device transceiver macrocell is stored.

12. The integrated circuit device as defined in claim 1,
the common transceiver macrocell being disposed on a side of the integrated circuit device.

13. The integrated circuit device as defined in claim 2,
the common transceiver macrocell being disposed on a side of the integrated circuit device.

14. An integrated circuit device comprising:
a plurality of common transceiver macrocells, each of the plurality of common transceiver macrocells transferring data through a serial bus and having a circuit necessary for host operation and a circuit necessary for device operation; and a setting information register that stores setting information that sets whether to use each of the plurality of common transceiver macrocells as a host transceiver macrocell or a device transceiver macrocell, each of the plurality of common transceiver macrocells including:

an analog front-end circuit including a circuit that transmits and receives data through the serial bus; and a logic circuit, the logic circuit including:

a parallel/serial conversion circuit that converts parallel data from an external circuit of the common transceiver macrocell into serial data;

a first parallel interface that serves as an interface between the external circuit and the parallel/serial conversion circuit;

a sampling clock generation circuit that generates a sampling clock signal that samples serial data received through the serial bus;

a serial/parallel conversion circuit that converts serial data received through the serial bus into parallel data; and a second parallel interface that serves as an interface between the serial/parallel conversion circuit and the external circuit, the plurality of common transceiver macrocells being disposed on one side of the integrated circuit device, and each of the plurality of common transceiver macrocells being set as the host transceiver macrocell or the device transceiver macrocell by rewriting the setting information stored in the setting information register.

15. An integrated circuit device comprising:

a plurality of common transceiver macrocells, each of the plurality of common transceiver macrocells transferring data through a serial bus and having a circuit necessary for host operation and a circuit necessary for device operation; and a setting information register that stores setting information that sets whether to use each of the plurality of common transceiver macrocells as a host transceiver macrocell or a device transceiver macrocell, each of the plurality of common transceiver macrocells including:

an analog front-end circuit including a circuit that transmits and receives data through the serial bus; and a logic circuit, the logic circuit including:

a parallel/serial conversion circuit that converts parallel data from an external circuit of the common transceiver macrocell into serial data;

a first parallel interface that serves as an interface between the external circuit and the parallel/serial conversion circuit;

a sampling clock generation circuit that generates a sampling clock signal that samples serial data received through the serial bus;

a serial/parallel conversion circuit that converts serial data received through the serial bus into parallel data; and a second parallel interface that serves as an interface between the serial/parallel conversion circuit and the external circuit, at least one of the plurality of common transceiver macrocells being respectively disposed on at least two of first to fourth sides of the integrated circuit device, and each of the plurality of common transceiver macrocells being set as the host transceiver macrocell or the device transceiver macrocell by rewriting the setting information stored in the setting information register.

16. The integrated circuit device as defined in claim 1, the serial bus being a Universal Serial Bus (USB) bus.

17. The integrated circuit device as defined in claim 2, the serial bus being a Universal Serial Bus (USB) bus.

18. An electronic instrument comprising:
the integrated circuit device as defined in claim 1; and
a processing section that controls the integrated circuit device.

19. An electronic instrument comprising:
the integrated circuit device as defined in claim 2; and
a processing section that controls the integrated circuit device.

20. An electronic instrument comprising:
the integrated circuit device as defined in claim 14; and
a processing section that controls the integrated circuit device.

21. An electronic instrument comprising:
the integrated circuit device as defined in claim 15; and
a processing section that controls the integrated circuit device.

22. The integrated circuit device as defined in claim 14, further comprising:

a reception logic circuit that receives parallel data from the serial/parallel conversion circuit of the logic circuit of each of the plurality of common transceiver macrocells;

a transmission logic circuit that outputs parallel data to the parallel/serial conversion circuit of the logic circuit of each of the plurality of common transceiver macrocells; and a transfer controller that controls data transfer through the serial bus and is coupled with the reception logic circuit and the transmission logic circuit, the transfer controller operating as a host controller when information that directs a host operation has been set in the setting information register, and the transfer controller operating as a device controller when information that directs a device operation has been set in the setting information register.

23. The integrated circuit device as defined in claim 15, further comprising:

a reception logic circuit that receives parallel data from the serial/parallel conversion circuit of the logic circuit of each of the plurality of common transceiver macrocells;

a transmission logic circuit that outputs parallel data to the parallel/serial conversion circuit of the logic circuit of each of the plurality of common transceiver macrocells; and a transfer controller that controls data transfer through the serial bus and is coupled with the reception logic circuit and the transmission logic circuit, the transfer controller operating as a host controller when information that directs a host operation has been set in the setting information register, and the transfer controller operating as a device controller when information that directs a device operation has been set in the setting information register.

* * * * *